(12) United States Patent
Nihei et al.

(10) Patent No.: US 7,705,823 B2
(45) Date of Patent: Apr. 27, 2010

(54) IMAGE DISPLAY UNIT

(75) Inventors: Norio Nihei, Kodaira (JP); Hajime Kitano, Kodaira (JP); Gaku Yakushiji, Kodaira (JP); Kazuya Murata, Kodaira (JP); Koji Takagi, Kawasaki (JP); Yoshitomo Masuda, Hamura (JP); Takahiro Kawagoe, Tokorozawa (JP); Reiji Hattori, Fukuoka (JP)

(73) Assignee: Bridgestone Corporation, Tokyo (JP)

( * ) Notice: Subject to any disclaimer, the term of this patent is extended or adjusted under 35 U.S.C. 154(b) by 1027 days.

(21) Appl. No.: 10/504,467

(22) PCT Filed: Feb. 7, 2003

(86) PCT No.: PCT/JP03/01341
§ 371 (c)(1),
(2), (4) Date: May 5, 2006

(87) PCT Pub. No.: WO03/069404
PCT Pub. Date: Aug. 21, 2003

(65) Prior Publication Data
US 2006/0238488 A1    Oct. 26, 2006

(30) Foreign Application Priority Data

| Feb. 15, 2002 | (JP) | ............................. 2002-037725 |
| Feb. 15, 2002 | (JP) | ............................. 2002-037729 |
| Feb. 21, 2002 | (JP) | ............................. 2002-044803 |
| Feb. 27, 2002 | (JP) | ............................. 2002-052024 |
| Apr. 17, 2002 | (JP) | ............................. 2002-114608 |
| Oct. 29, 2002 | (JP) | ............................. 2002-313808 |
| Oct. 29, 2002 | (JP) | ............................. 2002-313821 |
| Oct. 30, 2002 | (JP) | ............................. 2002-316587 |
| Oct. 30, 2002 | (JP) | ............................. 2002-316594 |
| Oct. 30, 2002 | (JP) | ............................. 2002-316624 |

(51) Int. Cl.
G09G 3/34    (2006.01)

(52) U.S. Cl. .................................... 345/107

(58) Field of Classification Search ................. 345/107
See application file for complete search history.

(56) References Cited

U.S. PATENT DOCUMENTS 6,774,879 B2 *    8/2004    Miyamoto et al. ............ 345/84

(Continued)

FOREIGN PATENT DOCUMENTS

EP    1 089 118 A2    4/2001

(Continued)

OTHER PUBLICATIONS

European Search Report dated Jan. 21, 2008.

(Continued)

Primary Examiner—Bipin Shalwala
Assistant Examiner—Steven E Holton
(74) Attorney, Agent, or Firm—Sughrue Mion, PLLC

(57) ABSTRACT

Each embodiment relates to an image display device which comprises an image display panel, in which two or more groups of particles having different colors and different charge characteristics are sealed between two substrates, at least one of two substrates being transparent, and, in which the particles, to which an electrostatic field produced by a pair of electrodes provided on one or both substrates is applied, are made to fly and move so as to display an image. Among them, in the first aspect of the invention, an image forming process for forming the image by applying an electric field pattern between the electrodes, the electric field pattern serving to fly particles A to the substrate at an image display side; and an image forming process for forming the image by applying an inversion (negative) electric field pattern with respect to the electric field pattern, the inversion electric field pattern serving to fly particles B having different colors and different charge characteristics with respect to those of the particles A to the substrate at an image display side; so that an image deleting process prior to forming the image to be displayed is eliminated.

10 Claims, 15 Drawing Sheets

U.S. PATENT DOCUMENTS

2002/0044333 A1 * 4/2002 Shigehiro et al. ........... 359/296

FOREIGN PATENT DOCUMENTS

| JP | 2001-312225 | 11/2001 |
| JP | 2002-14376 | 1/2002 |
| JP | 2002-14654 | 1/2002 |
| JP | 2002-139752 | 5/2002 |

OTHER PUBLICATIONS

International Search Report, PCT/JP03/01341, May 20, 2003.

Gugrae-Jo et al., "New toner display device (I): image display using conductive toner and charge transport layer," Japan Hardcopy Proceedings, Jul. 21, 1999, pp. 249-252.

* cited by examiner

☐ Pixel to which voltages with inverse phase are applied at display electrode and opposed electrode

FIG. 10a
20×20dot matrix display
FIG. 10b
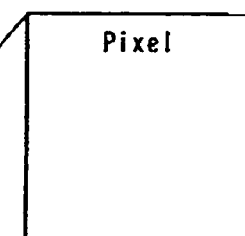
Pixel
FIG. 10c
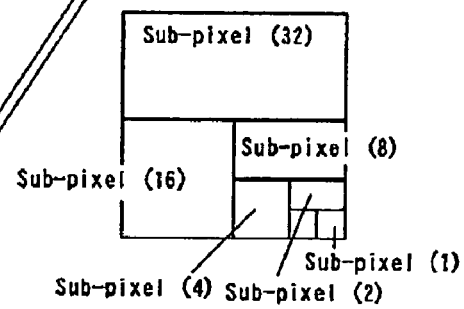
Sub-pixel (32)
Sub-pixel (16)
Sub-pixel (8)
Sub-pixel (4)
Sub-pixel (2)
Sub-pixel (1)
Sub-pixel segmentalization using two's power useful for matrix
FIG. 10d
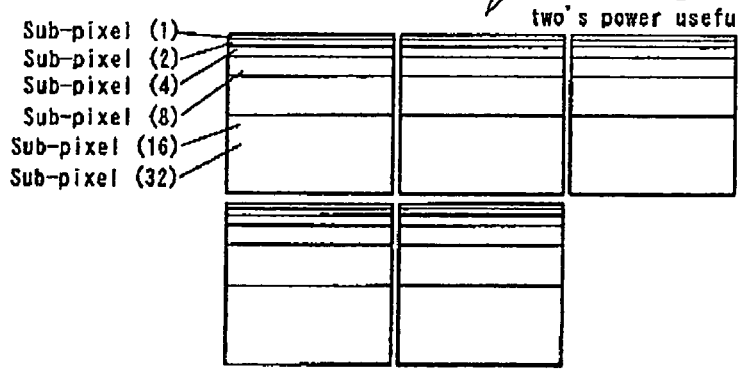
Sub-pixel (1)
Sub-pixel (2)
Sub-pixel (4)
Sub-pixel (8)
Sub-pixel (16)
Sub-pixel (32)
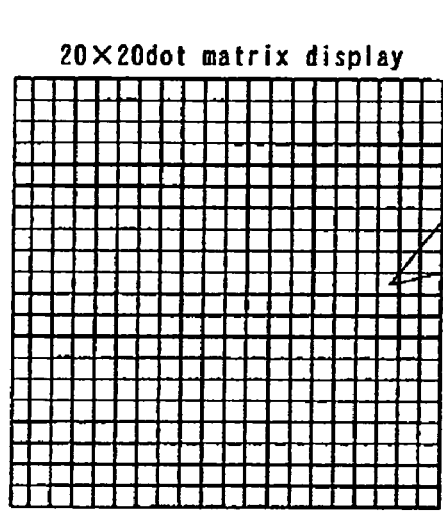

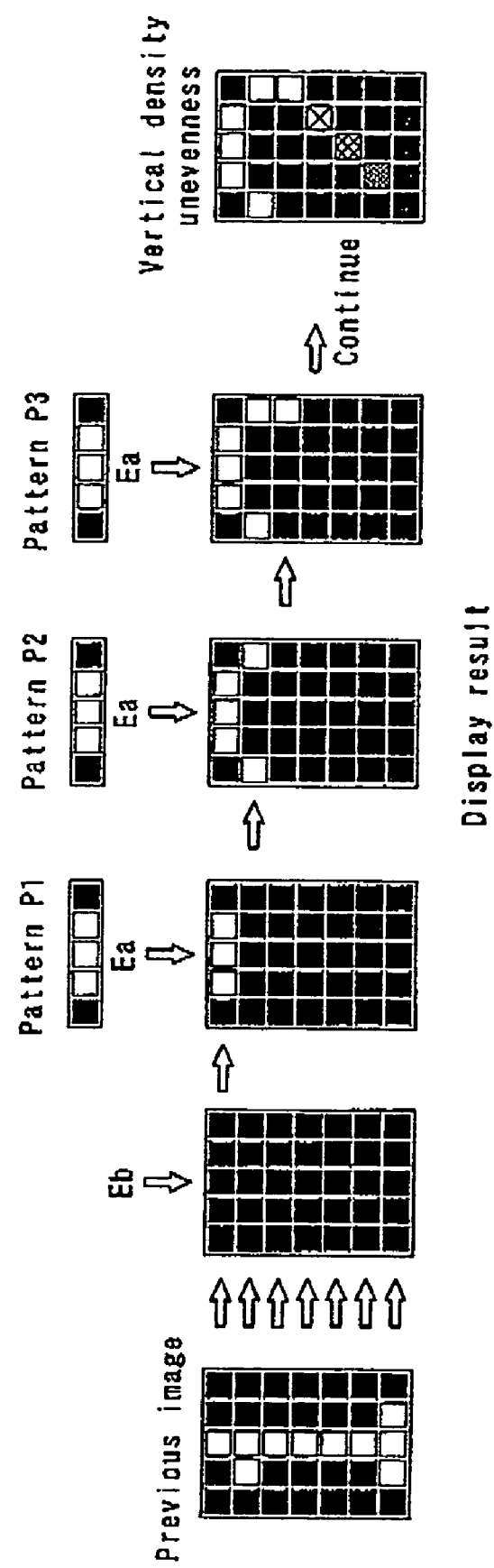

IMAGE DISPLAY UNIT

TECHNICAL FIELD

The present invention relates to an image display device comprising an image display panel enables to repeatedly display or eliminate images accompanied by flight and movement of particles utilizing Coulomb's force and so on.

BACKGROUND ART

As an image display device substitutable for liquid crystal display (LCD), image display devices with the use of technology such as an electrophoresis method, an electro-chromic method, a thermal method, dichroic-particles-rotary method are proposed.

As for these image display device, it is conceivable as inexpensive visual display device of the next generation from a merit having wide field of vision close to normal printed matter, having smaller consumption with LCD, spreading out to a display for portable device, and an electronic paper is expected. Recently, electrophoresis method is proposed that microencapsulate dispersion liquid made up with dispersion particles and coloration solution and dispose the liquid between faced substrates.

However, in the electrophoresis method, there is a problem that a response speed is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electroconductive particles and a charge transport layer are installed in a part of the substrate without using solution is proposed. However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an image display device comprising an image display panel is known, in which two or more groups of particles having different colors and different charge characteristics are sealed between two substrates, at least one of two substrates being transparent, and, in which the particles, to which an electrostatic field produced by a pair of electrodes provided on respective substrates is applied, are made to fly and move so as to display an image by means of Coulomb's force.

Tasks to be solved by a first aspect of the invention are as follows. That is, the image display device mentioned above has a display memory property (keeping display even after power OFF). In the case of the image display device having such display memory property, it is necessary to form one image by alternately changing an electric field direction Ea (polarity) in which particles A are flown toward a display substrate and an electric field direction Eb in which particles B having different colors and different charge characteristics as those of the particles A are flown toward the display substrate. That is, in the case that an image-1 formed by the particles A and the particles B is rewritten to an image-2 formed also by the particles A and the particles B, if the image-2 is rewritten only by Ea, only a portion at which the particles A are flown to the display panel by Ea is rewritten, and a portion which is rewritable by the particles B is not changed.

Therefore, as shown in FIG. 15, it is thought one method wherein the image is formed in such a manner that an image deleting step is performed prior to an image forming step (the image is formed only by the particles A or the particles B) and then the image forming step is performed by using the electric field direction different from the electric field direction using at the image deleting step. However, in the case of matrix display for example, as shown in FIG. 16, if the image deleting step is performed at a front line of a frame time, a portion wherein the image is formed first in the frame time (line) and a portion wherein the image is formed last in the frame time (line) have a different time duration from one image deleting step to the next image deleting step. Therefore, there is a drawback such that density unevenness occurs in the image and a display quality is extremely deteriorated.

Tasks to be solved by a second aspect of the invention are as follows. That is, the image display device mentioned above has a display memory property (keeping display even after power OFF). In the case of the image display device having such display memory property, it is necessary to form one image by alternately changing an electric field direction Ea (polarity) in which particles A are flown toward a display substrate and an electric field direction Eb in which particles B having different colors and different charge characteristics as those of the particles A are flown toward the display substrate. Therefore, in the case of displaying a halftone image by this image display device, it is possible to obtain a halftone image by adjusting a display time ratio of particle A/particle B during the interval such that the particle A/particle B is repeated by applying the electric fields Ea and Eb at a frequency where flickering is not detected by a human eye. However, the halftone image display according to the method mentioned above has a drawback such that the image memory property cannot be obtained.

Tasks to be solved by a third aspect of the invention are as follows. That is, the image display device mentioned above has a display memory property (keeping display even after power OFF). In the case of the image display device having such display memory property, it is necessary to form one image by alternately changing an electric field direction Ea (polarity) in which particles A are flown toward a display substrate and an electric field direction Eb in which particles B having different colors and different charge characteristics as those of the particles A are flown toward the display substrate. In the image display device mentioned above, the halftone image display is performed by displaying repeatedly the particle A/particle B at a frequency where flickering is not detected by a human eye and changing a ratio thereof. However, the halftone image display according to the method mentioned above has a drawback such that the image memory property cannot be obtained.

Tasks to be solved by a fourth aspect of the invention are as follows. That is, the image display device mentioned above has a display memory property (keeping display even after power OFF). In the case of the image display device having such display memory property, it is necessary to form one image by alternately changing an electric field direction Ea (polarity) in which particles A are flown toward a display substrate and an electric field direction Eb in which particles B having different colors and different charge characteristics as those of the particles A are flown toward the display substrate. Therefore, in the case of displaying a halftone image by this image display device, it is possible to obtain a halftone image by adjusting a display time ratio of particle A/particle B during when the particle A/particle B is repeated by applying the electric fields Ea/Eb. However, the halftone image display according to the method mentioned above has a drawback such that a driving circuit of image display elements becomes complicated.

Tasks to be solved by a fifth aspect of the invention are as follows. That is, the image display device mentioned above is assumed to perform a binary display from a microscopic view, but the halftone display due to respective pixels is accomplished by maintaining an intermediate state such that particle characteristics are intentionally deviated and a part of particles which are easily flown is only moved.

However, the halftone image display according to the method mentioned above has a drawback such that an excellent reproducibility of the halftone image display cannot be performed since resistivity and so on of ITO transparent electrode is deviated, an electrode surface is contaminated by a particle component, and a threshold voltage when the particles are moved from the electrode surface due to a throw off force larger than an adhesion force. Therefore, especially in the case of performing the matrix drive that needs a precipitous threshold, the number of gray scales that can be displayed is limited.

DISCLOSURE OF INVENTION

An object of the first aspect of the invention is to provide an image display device of dry type having rapid response, simple and inexpensive construction, and excellent stability, which can reduce density unevenness and maintain a display quality.

According to the first aspect of the invention, an image display device which comprises an image display panel, in which two or more groups of particles having different colors and different charge characteristics are sealed between two substrates, at least one of two substrates being transparent, and, in which the particles, to which an electrostatic field produced by a pair of electrodes provided on one or both substrates is applied, are made to fly and move so as to display an image, is characterized in that the image display device has an image (to be displayed) forming process comprising an image forming process for forming the image by applying an electric field pattern between the electrodes, the electric field pattern serving to fly particles A to the substrate at an image display side; and an image forming process for forming the image by applying an inversion (negative) electric field pattern with respect to the electric field pattern, the inversion electric field pattern serving to fly particles B having different colors and different charge characteristics with respect to those of the particles A to the substrate at an image display side; so that an image deleting process prior to forming the image to be displayed is eliminated.

According to the image display device of the first aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Moreover, since the image deleting process prior to forming the image to be displayed is eliminated, it is possible to reduce density unevenness and maintain the display quality.

In the image display device according to the first aspect of the invention, it is preferred that, in a matrix display, the image is formed by switching a direction of the electric field to be applied sequentially during an image forming process of a portion where the display is rewritable at once (normally one line), and, that, in a matrix display, the image is first formed by applying an electric field having a same direction to a plurality of portions where the display is rewritable at once (normally one line), and then the image of the same portion as the previous process is formed by switching a direction of the electric field to be applied.

An object of the second aspect of the invention is to provide an image display device of dry type having a rapid response, simple and inexpensive construction, and excellent stability, which can utilize a display memory property and display an excellent halftone image.

According to the second aspect of the invention, an image display device which comprises an image display panel, in which two or more groups of particles having different colors and different charge characteristics are sealed between two substrates, at least one of two substrates being transparent, and, in which the particles, to which an electrostatic field produced by a pair of electrodes provided on one or both substrates is applied, are made to fly and move so as to display an image, is characterized in that, on the occasion when the image to be displayed is formed, a display state such that two or more groups of particles are mixed with a predetermined ratio is obtained by adjusting, in response to a display density, at least one of strength, applying time and applying number of the electric field applied between the electrodes.

According to the image display device of the second aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Moreover, in order to display a halftone image, since a display state such that two or more groups of particles are mixed with a predetermined ratio is obtained by adjusting, in response to a display density, at least one of strength, applying time and applying number of the electric field applied between the electrodes, it is possible to utilize a display memory property and display an excellent halftone image.

In the image display device according to the second aspect of the invention, it is preferred that, prior to the electric field applying process for obtaining the display state such that two or more groups of particles are mixed with a predetermined ratio, a reset electric field for resetting states of two or more groups of particles is applied. In this case, since the states of two or more groups of particles are once reset prior to the halftone image display, it is possible to eliminate an influence of the display state prior to the halftone image display and to realize a desired excellent halftone image display with good reproducibility.

Moreover, in the image display device according to the second aspect of the invention, it is preferred that the reset electric field is an alternating electric field. In this case, since it is possible to generate a desired state such that an interaction between the particles and the electrode surfaces becomes minimum by flying the particles A and the particles B constructing two or more groups of particles between the electrodes, it is possible to realize a mix state of particles A/particles B with a more excellent reproducibility by means of a voltage application performed successively.

Further, in the image display device according to the second aspect of the invention, it is preferred that the reset electric field is a pulse electric field. In this case, when the frame scan time during for example a motion picture display is limited, since the reset electric field sufficient for flying all the particles is applied in a pulsate state, it is possible to obtain a desired reset state in a short time period.

An object of the third aspect of the invention is to provide an image display device of dry type having a rapid response, simple and inexpensive construction, and excellent stability, which can utilize a display memory property and display an excellent halftone image.

According to the third aspect of the invention, an image display device which comprises an image display panel, in which two or more groups of particles having different colors and different charge characteristics are sealed between two substrates, at least one of two substrates being transparent, and, in which the particles, to which an electrostatic field produced by a pair of electrodes provided on one or both substrates is applied, are made to fly and move so as to display an image, is characterized in that one pixel is segmentalized to a plurality of sub-pixels, and a halftone image is displayed by a display pattern of the sub-pixels.

According to the image display device of the third aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Moreover, since the halftone image display is not performed by repeating particles A/particles B, it is possible to utilize a display memory property and display an excellent halftone image.

In the image display device according to the third aspect of the invention, the present invention can be preferably applied to the case such that the plural sub-pixels have different size with each other and to the case such that all the plural sub-pixels have same size. In the case that the plural sub-pixels have different size with each other, it is preferred that a size of the sub-pixel is segmentalized to be a two's power and that a size of the sub-pixel is determined on the basis of γ correction coefficient due to a visual sensitivity.

Moreover, in the image display device according to the third aspect of the invention, it is preferred that one frame is segmentalized to a plurality of sub-frames, and a halftone image is displayed by also a display pattern deviation of the sub-pixels. In this case, since a halftone image display due to the sub-pixels and a halftone image display due to the sub-frames are both utilized, it is possible to indicate more number of gray levels as compared with the case such that the halftone image display is performed by utilizing either one of the cases mentioned above.

An object of the fourth aspect of the invention is to provide an image display device of dry type having a rapid response, simple and inexpensive construction, and excellent stability, which can utilize a display memory property and display an excellent halftone image.

According to the fourth aspect of the invention, an image display device which comprises an image display panel, in which two or more groups of particles having different colors and different charge characteristics are sealed between two substrates, at least one of two substrates being transparent, and, in which the particles, to which an electrostatic field produced by a pair of electrodes provided on one or both substrates is applied, are made to fly and move so as to display an image, is characterized in that a sub-frame having a length smaller than that of one frame is formed, and a halftone image is displayed by a display pattern formed by at least one sub-frames.

According to the image display device of the fourth aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Further, as to a method for displaying a halftone image, use is made of the method such that a sub-frame having a length smaller than that of one frame is formed, and a halftone image is displayed by a display pattern formed by at least one sub-frames, in stead of a method such that a display area ratio of particles A/particles B is adjusted. Therefore, it is possible to display a halftone image without complicating a drive circuit of image display elements.

In the image display device of the fourth aspect of the invention, it is preferred that the sub-frames have a different length with each other. In this case, since it is possible to obtain more gray levels even if using a driving clock with lower frequency, the image display unit can be made compact and inexpensive.

Moreover, in the image display device of the fourth aspect of the invention, it is preferred that respective lengths of plural sub-frames is a length obtained by multiplying a unit length and a two's power. In this case, it is possible to obtain more gray levels even if using a rough dividing number.

Further, in the image display device of the fourth aspect of the invention, it is preferred that respective lengths of plural sub-frames is determined on the basis of γ correction coefficient due to a visual sensitivity. In this case, it is possible to prevent an image distortion at a high-density display portion and to realize the image display unit having excellent representation power.

Furthermore, in the image display device of the fourth aspect of the invention, it is preferred that one pixel is segmentalized to a plurality of sub-pixels, and a halftone image is displayed by a display pattern formed by at least one of plural sub-pixels. In this case, it is possible to extremely increase the number of gray levels by using also the halftone image display due to the sub-frames.

An object of the fifth aspect of the invention is to provide an image display device of dry type having a rapid response, simple and inexpensive construction, and excellent stability, which can utilize a display memory property and display an excellent halftone image.

According to the fifth aspect of the invention, an image display device which comprises an image display panel, in which two or more groups of particles having different colors and different charge characteristics are sealed between two substrates, at least one of two substrates being transparent, and, in which the particles, to which an electrostatic field produced by a pair of electrodes provided on one or both substrates is applied, are made to fly and move so as to display an image, is characterized in that at least one of voltage value, waveform, applying time and applying number of the voltage applied between the electrodes is adjusted in response to a gray level of respective pixels forming the image to be displayed, in such a manner that an integral value of a fly/move current generating at a fly/move motion of particles becomes a predetermined target value.

According to the image display device of the fifth aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Further, as to a method for displaying a halftone image, use is made of the method such that at least one of voltage value, waveform, applying time and applying number of the voltage applied between the electrodes is adjusted in response to a gray level of respective pixels forming the image to be displayed, in such a manner that an integral value of a fly/move current generating at a fly/move motion of particles becomes a predetermined target value. Therefore, it is possible to display the halftone image with excellent reproducibility.

In the image display device of the fifth aspect of the invention, it is preferred that the image display device comprises a fly/move current deleting portion for deleting the fly/move current, an integrator for integrating the fly/move current, and a comparator for comparing the integral value of the fly/move current and a gray level indicating voltage corresponding to the gray level. In this case, it is possible to construct an adjusting circuit with simple and inexpensive manner wherein at least one of voltage value, waveform, applying time and applying number of the voltage applied between the electrodes is adjusted.

Moreover, in the image display device of the fifth aspect of the invention, it is preferred that a deviation between the integral value of the fly/move current and the gray level indicating voltage corresponding to the gray level is corrected by feeding-back an output of the comparator to an output voltage generating portion of a particle drive controlling circuit. In this case, it is possible to display respective pixels constructing the image to be displayed with an excellent reproducibility and a desired gray level.

Moreover, in the image display device of the fifth aspect of the invention, it is preferred that a first current waveform generating when a voltage less than a threshold voltage where the particles are made to fly and move is applied and a second current waveform generating when a voltage larger than the threshold voltage is applied are observed, and the second current waveform is corrected on the basis of the first current waveform. In this case, it is possible to optimize a current waveform, which is used for calculating the fly/move current.

BRIEF DESCRIPTION OF DRAWINGS

FIGS. 10a-10d are schematic views respectively showing one embodiment of the sub-pixels in the image display device according to the invention.

FIG. 16 is a schematic view for explaining a problem in the known image display device shown in FIG. 15.

BEST MODE FOR CARRYING OUT THE INVENTION

First of all, an image display device according to a first aspect to a fifth aspect of the invention will be explained. Then, respective embodiments will be explained.

Figure 1A:
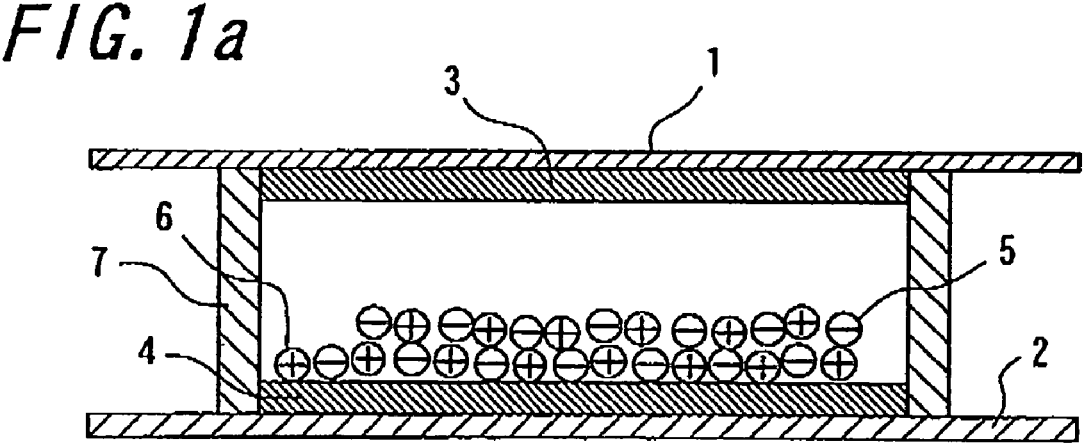
FIGS. 1a to 1c are schematic views respectively showing one embodiment of the image display element of the image display panel used for the image display device according to the invention and its display driving method.
Figure 1B:
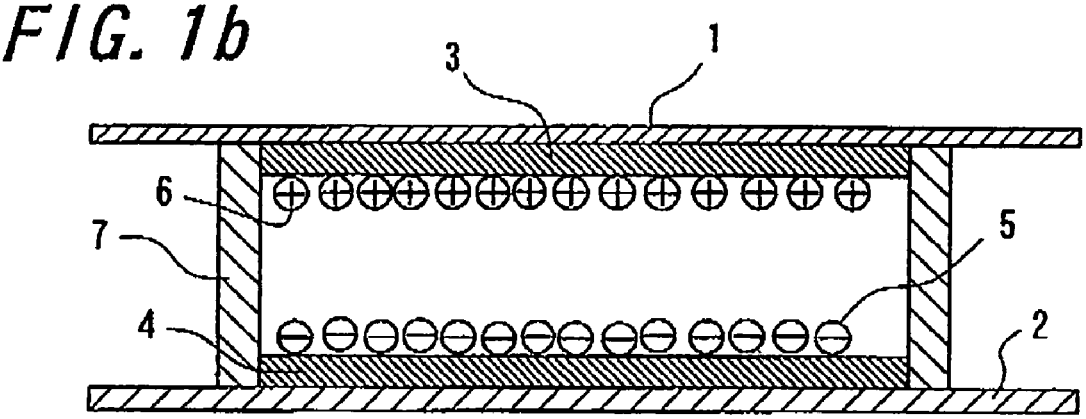
Figure 1C:
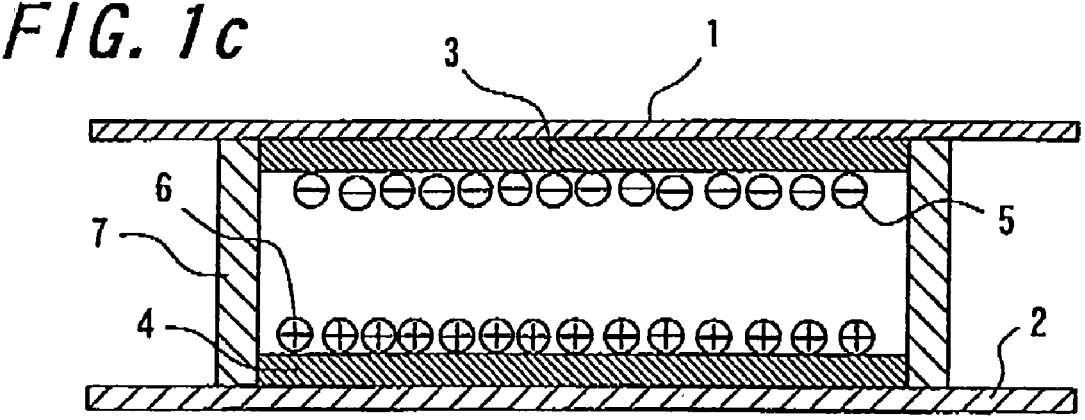

FIGS. 1a to 1c are schematic views respectively showing one embodiment of the image display element of the image display panel used for the image display device according to the invention and its display driving method. In the embodiments shown in FIGS. 1a to 1c, numeral 1 is a transparent substrate, numeral 2 is an opposed substrate, numeral 3 is a display electrode (transparent electrode), numeral 4 is an opposed electrode, numeral 5 is a negatively chargeable particle, numeral 6 is a positively chargeable particle and numeral 7 is a partition wall.

FIG. 1a shows a state such that the negatively chargeable particles 5 and the positively chargeable particles 6 are arranged between opposed substrates (transparent substrate 1 and opposed substrate 2). Under such a state, when a voltage is applied in such a manner that a side of the display electrode 3 becomes low potential and a side of the opposed electrode 4 becomes high potential, as shown in FIG. 1b, the positively chargeable particles 6 fly and move to the side of the display electrode 3 and the negatively chargeable particles 5 fly and move to the side of the opposed electrode 4 by means of Coulomb's force. In this case, a display face viewed from a side of the transparent substrate 1 looks like a color of the positively chargeable particles 6. Next, when a voltage is applied in such a manner that the side of the display electrode 3 becomes high potential and the side of the opposed electrode 4 becomes low potential by reversing potentials, as shown in FIG. 1c, the negatively chargeable particles 5 fly and move to the side of the display electrode 3 and the positively chargeable particles 6 fly and move to the side of the opposed electrode 4 by means of Coulomb's force. In this case, the display face viewed from the side of the transparent substrate 1 looks like a color of the negatively chargeable particles 5.

The display states shown in FIGS. 1b and 1c are repeatedly changeable only by reversing the potentials of a power source, and thus it is possible to change colors on the display face reversibly by reversing the potentials of the power source as mentioned above. The colors of the particles can be arbitrarily selected. For example, when the negatively chargeable particles 5 are white color and the positively chargeable particles 6 are black color, or, when the negatively chargeable particles 5 are black color and the positively chargeable particles 5 are white color, a reversible image display between white color and black color can be performed. In this method, since the particles are once adhered to the electrode by means of an imaging force, a display image can be maintained for a long time after a voltage apply is stopped, thereby showing an excellent memory property.

In the present invention, since the chargeable particles fly and move in the gas, the response speed of the image display is extremely fast and the response speed of shorter than 1 msec may be possible. Moreover, it is not necessary to use an orientation film and a polarizing plate as the liquid crystal display, and thus it is possible to make the structure simple and to realize the image display device having a large display area at a lower cost. In addition, it is stable with respect to a temperature variation and can be used in a wide temperature range from a low temperature to a high temperature. Further, it is not affected by an angle of visual field and has a high reflection coefficient. Therefore, it is easily viewable and has low electric power consumption. Furthermore, it has an excellent memory property and thus it is not necessary to use an electric power when the image is to be maintained.

The image display device according to the first aspect of the invention comprises the image display panel in which the image display element mentioned above is arranged in a matrix manner. FIGS. 2a and 2b to FIGS. 4a and 4b show such one embodiment respectively. The example shown in FIGS. 2a and 2b can be applied to first aspect, third aspect and fourth aspect of the invention explained later, the example shown in FIGS. 3a and 3b can be applied to a second aspect of the invention explained later, and the example shown in FIGS. 4a and 4b can be applied to a fifth aspect of the invention explained later. In these embodiments, 3×3 matrix is shown for convenience of explanation. When the number of the electrodes is n, it is possible to construct an arbitrary n×n matrix.

Figure 2A:
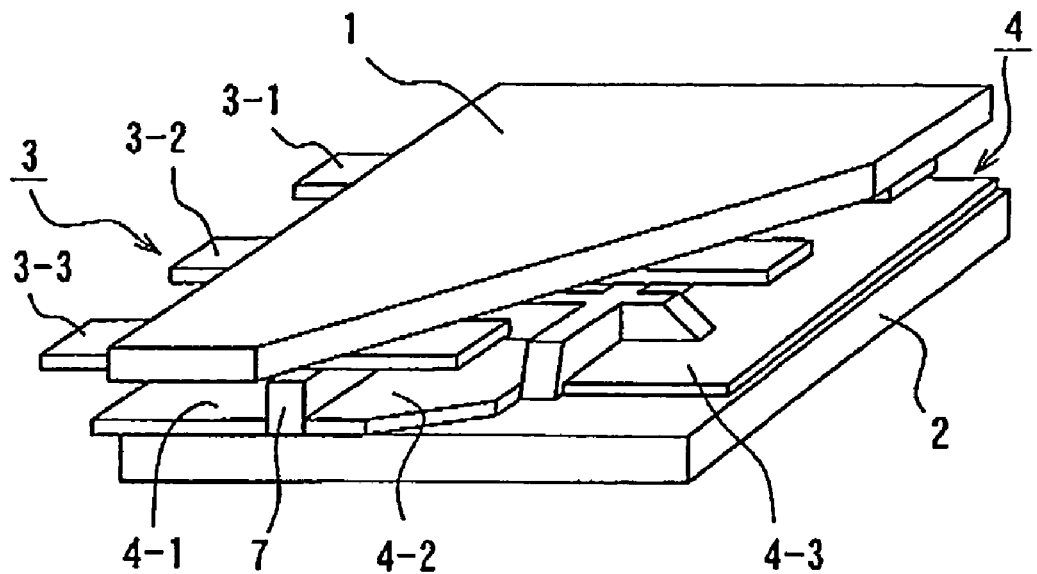
FIGS. 2a and 2b are schematic views respectively illustrating one embodiment of the image display device according to the invention in which the image display element is arranged in a matrix manner.
Figure 2B:
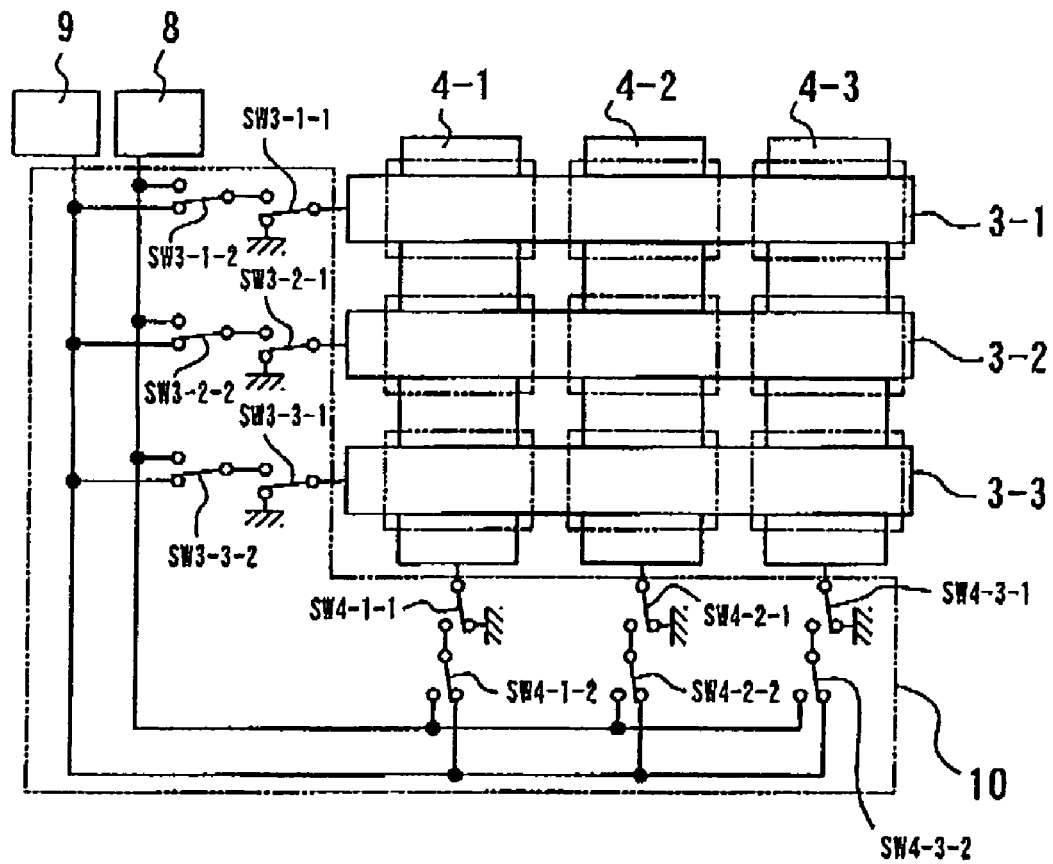

In the embodiment shown in FIGS. 2a and 2b, display electrodes 3-1 to 3-3 arranged substantially in parallel with each other and opposed electrodes 4-1 to 4-3 arranged substantially in parallel with each other are provided respectively on the transparent substrate 1 and the opposed substrate 2 in such a manner that they are intersected with each other. Serial switches SW3-1-1 and SW3-1-2; serial switches SW3-2-1 and SW3-2-2; and serial switches SW3-3-1 and SW3-3-2 are respectively connected to the display electrodes 3-1 to 3-3. In the same way, serial switches SW4-1-1 and SW4-1-2; serial switches SW4-2-1 and SW4-2-2; and serial switches SW4-3-2 and SW4-3-2 are respectively connected to the opposed electrodes 4-1 to 4-3.

The switches SW3-n-1 (n=1-3) and the switches SW4-n-1 (n=1-3) serve to switch the connection toward a ground level and the connection toward the next SW respectively. The switches SW3-n-2 (n=1-3) and the switches SW4-n-2 (n=1-3) serve to switch the connection toward a high voltage generating circuit 8 and the connection toward a low voltage generating circuit 9 respectively. Moreover, in this embodiment, the 3×3 image display elements are constructed by isolating them by means of the partition walls 7, but the partition walls 7 are not an essential member and may be eliminated.

The operation of the matrix electrode constructed by the display electrodes 3-1 to 3-3 and the opposed electrodes 4-1 to 4-3 mentioned above is performed in such a manner that, in accordance with the image to be displayed, open/close operations of respective switches SW are controlled by means of a sequencer not shown and the 3×3 image display elements are displayed in sequence. This operation is the same as that of the known one.

Figure 3A:
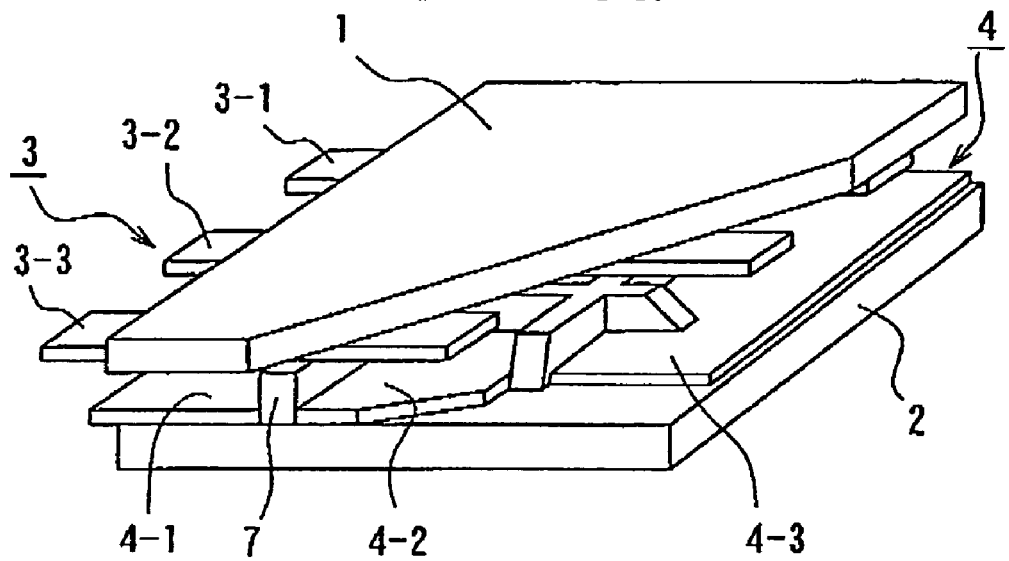
FIGS. 3a and 3b are schematic views respectively depicting another embodiment of the image display panel of the image display device according to the invention.
Figure 3B:
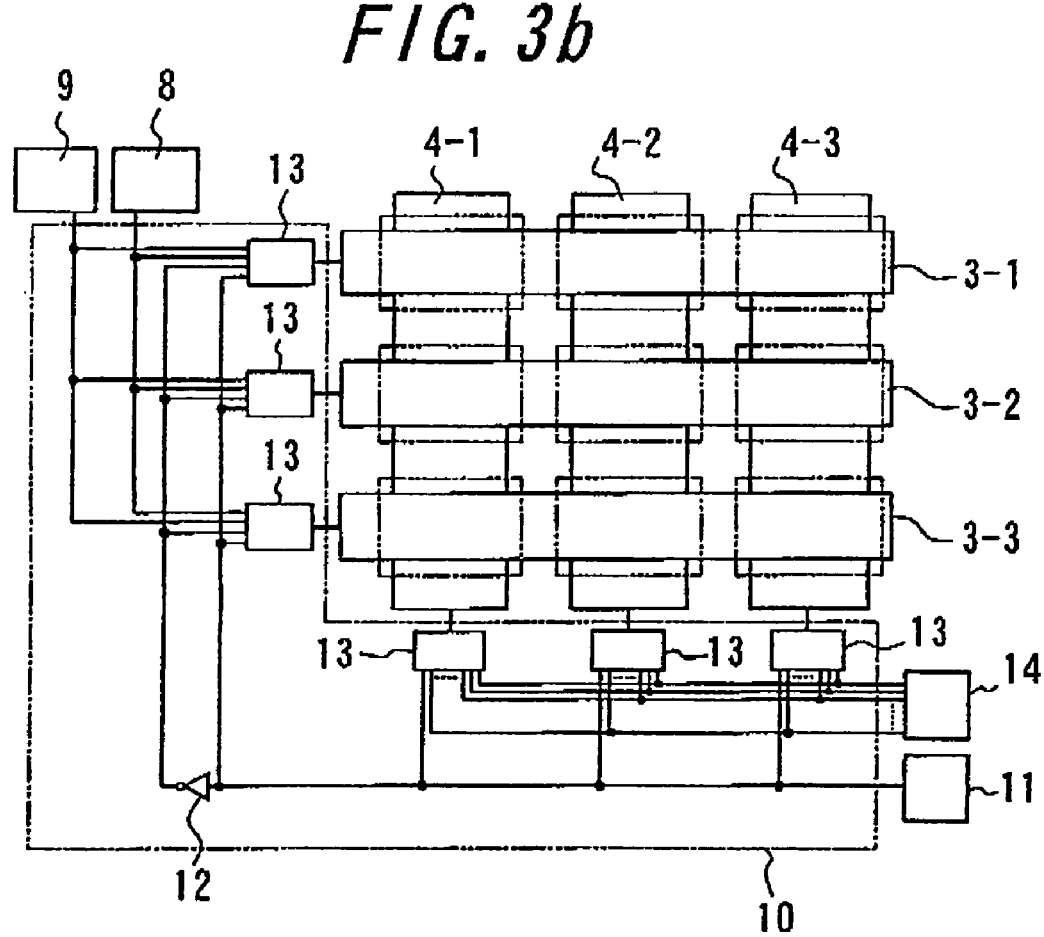

In the embodiment shown in FIGS. 3a and 3b, display electrodes 3-1 to 3-3 arranged substantially in parallel with each other and opposed electrodes 4-1 to 4-3 arranged substantially in parallel with each other are provided respectively on the transparent substrate 1 and the opposed substrate 2 in such a manner that they are intersected with each other. Voltage selection devices 13 are respectively connected to the display electrodes 3-1 to 3-3. In the same way, voltage selection devices 13 are respectively connected to the opposed electrodes 4-1 to 4-3.

Respective voltage selection devices 13 connected to the display electrode side serves to apply one of voltages selected from a group of a high voltage obtained from a high voltage generation circuit 8, a low voltage obtained from a low voltage generation circuit 9, a reset voltage obtained from a reset voltage generation circuit 11, and an inversion reset voltage obtained from an inverter 12 to the display electrodes 3-1 to 3-3. In addition, respective voltage selection devices 13 connected to the opposed electrode side serves to apply one of voltages selected from a group of the reset voltage obtained from the reset voltage generation circuit 11, and a plurality of gray level voltages (for example, the same number as that of the desired gray levels) obtained from a gray level voltage generation circuit 14 to the opposed electrodes 4-1 to 4-3. All the voltage selection devices 13 construct a matrix drive circuit 10. In this embodiment, the 3×3 image display elements are constructed by isolating them by means of the partition walls 7, but the partition wall 7 is not an essential member and may be eliminated.

In a drive controlling with respect to the matrix electrode consisting of the display electrodes 3-1 to 3-3 and the opposed electrodes 4-1 to 4-3, an operation such that the 3×3 image display elements are displayed respectively one by one is performed by controlling an operation of respective voltage selection devices 13 by means of a controlling of a sequencer (not shown) corresponding to the image to be displayed. This operation is basically same as that of the known one. In addition, according to the present invention, an operation for displaying a halftone image (gray level display) and a particle state reset operation prior to the halftone image display are performed (these operations will be explained later in detail).

Figure 4A:
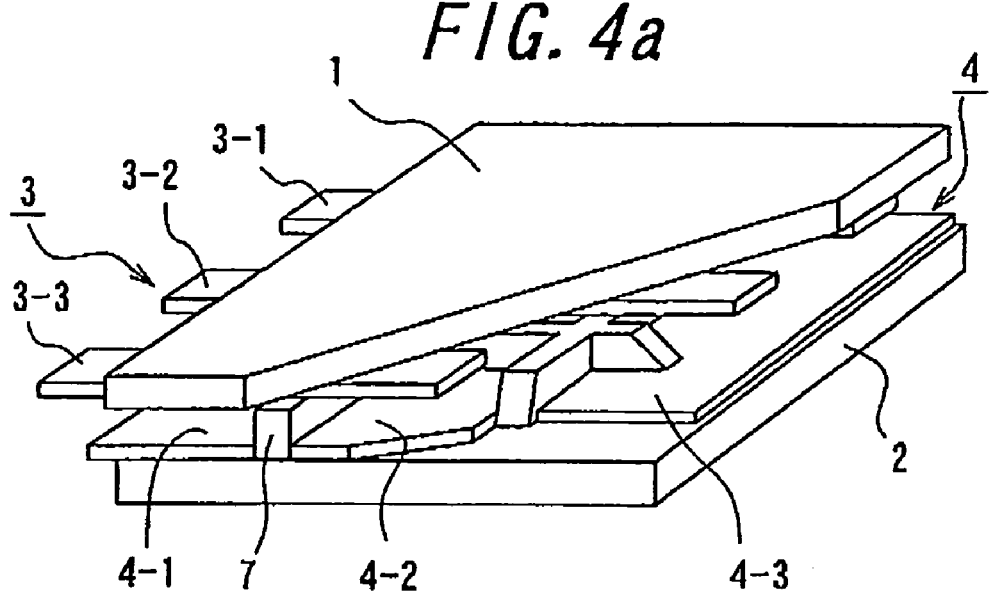
FIGS. 4a and 4b are schematic views respectively showing still another embodiment of the image display panel of the image display device according to the invention.
Figure 4B:
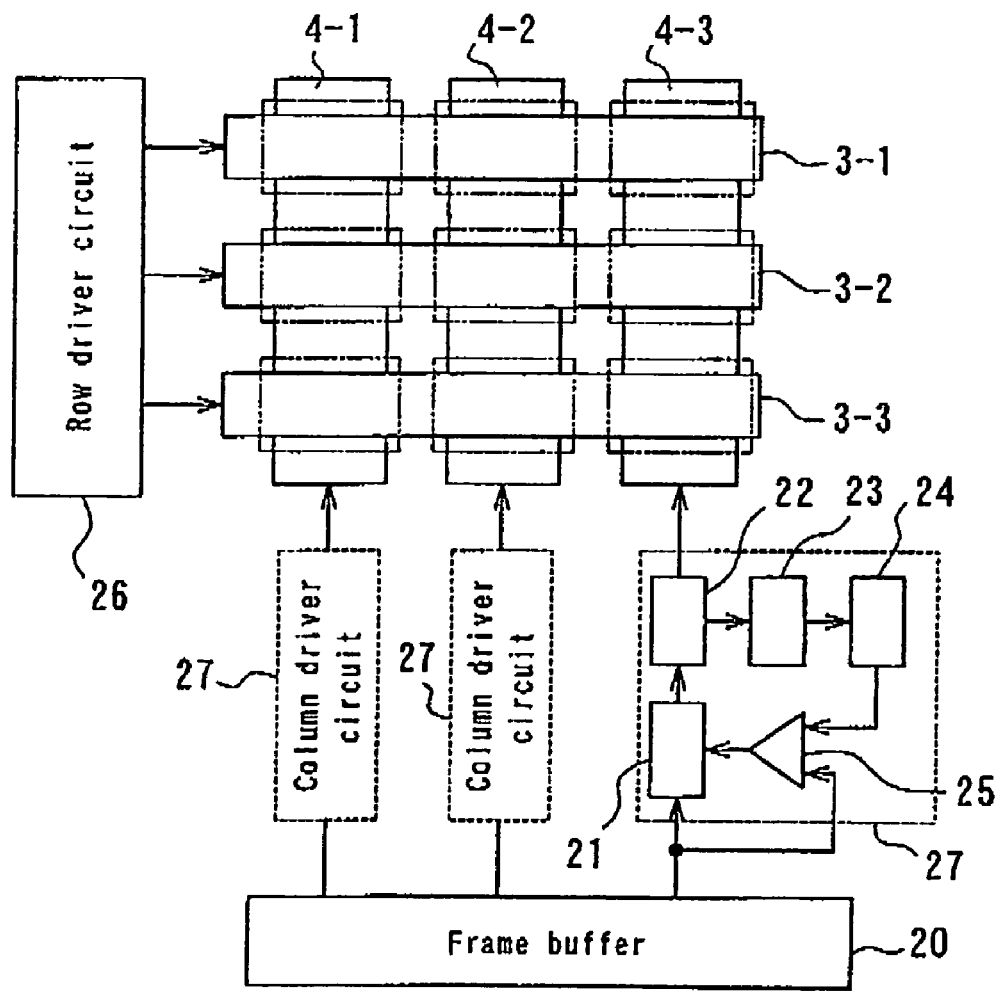

In the embodiment shown in FIGS. 4a and 4b, the display electrodes (scan electrodes) 3-1 to 3-3 arranged substantially in parallel with each other and the opposed electrodes (data electrodes) 4-1 to 4-3 arranged substantially in parallel with each other are provided respectively on the transparent substrate 1 and the opposed substrate 2 in such a manner that they are intersected with each other. A row driver circuit 26 is connected to the display electrodes 3-1 to 3-3 respectively. In the same way, a frame buffer 20 is connected to the opposed electrodes 4-1 to 4-3 respectively through a column driver circuit 27. As shown in FIG. 4b, respective column driver circuit 27 comprises voltage generation circuit 21, current/voltage conversion circuit 22, inversion current detector 23, integrator 24 and comparator 25. The column driver circuit 27 constructs a simple and inexpensive adjusting circuit for adjusting a voltage value of the gray level voltage applied between the electrodes.

The row driver circuit 26 connected to the display electrode side has a function for generating a scan signal for scanning successively the display electrodes 3-1 to 3-3. Moreover, the frame buffer 20 connected to the opposed electrode side has a function for outputting a gray level indication voltage on the selected opposed electrode to the column driver circuit 27. Further, the column driver circuit 27 has a function for outputting a gray level voltage corresponding to the input gray level indication voltage to the opposed electrode and a function for correcting a fly/move current as mentioned below. All the row driver circuit 26, the column driver circuit 27, and the frame buffer 20 construct a matrix drive circuit. In this embodiment, the 3×3 image display elements are constructed by isolating them by means of the partition walls 7, but the partition wall 7 is not an essential member and may be eliminated.

In a drive controlling with respect to the matrix electrode consisting of the display electrodes 3-1 to 3-3 and the opposed electrodes 4-1 to 4-3, an operation such that the 3×3 image display elements are displayed respectively one by one is performed by controlling operations of the row driver circuit 26, the column driver circuit 27 and the frame buffer 20 by means of a controlling of a sequencer (not shown) corresponding to the image to be displayed. This operation is basically same as that of the known one. In addition, according to the present invention, an operation for displaying a halftone image (gray level display) and a particle state reset operation prior to the halftone image display are performed (these operations will be explained later in detail).

Hereinafter, respective portions of the image display device will be explained.

The operation of the matrix electrode constructed by the display electrodes 3-1 to 3-3 and the opposed electrodes 4-1 to 4-3 mentioned above is performed in such a manner that, in accordance with the image to be displayed, open/close operations of respective switches SW are controlled by means of a sequencer not shown and the 3×3 image display elements are displayed in sequence. This operation is the same as that of the known one.

In the case of the display electrode arranged on the transparent substrate, respective electrodes consisting of the matrix electrode is formed of electroconductive materials which are transparent and having pattern formation capability. As such electroconductive materials, metals such as aluminum, silver, nickel, copper, and gold, or transparent electroconductive metal oxides such as ITO, electroconductive tin oxide, and electroconductive zinc oxide formed in the shape of thin film by sputtering method, vacuum vapor deposition method, CVD (Chemical Vapor Deposition) method, and coating method, or coated materials obtained by applying the mixed solution of an electroconductive agent with a solvent or a synthetic resin binder are used.

Typical examples of the electroconductive material include cationic polyelectrolyte such as benzyltrimethylammonium chloride, tetrabutylammonium perchlorate, and so on, anionic polyelectrolyte such as polystyrenesulfonate, polyacrylate, and so on, or electroconductive fine powders of zinc oxide, tin oxide, or indium oxide. Additionally, the thickness of the electrode may be suitable unless the electroconductivity is absent or any hindrance exists in optical transparency, and it is preferable to be 3 to 1000 nm, more preferable to be 5 to 400 nm. The foregoing transparent electrode materials can be employed as the opposed electrode, however, non-transparent electrode materials such as aluminum, silver, nickel, copper, and gold can be also employed.

Hereinafter, the substrate used in the image display device according to the invention will be explained. With regards to the substrate, at least one substrate must be transparent substrate capable of recognizing the displaying color from outside of the display panel, and a material with large transmission factor of visible light and with excellent heat resistance is preferable. The presence of flexibility as the image display device is selected appropriately by the usage, for example, the flexible materials are selected for the usage as an electronic paper and so on, and materials having no flexibility are selected for the usage as display units for portable devices such as cellular phones, PDAs, and notebook personal computers.

Examples of the substrate material include polymer sheets such as polyethylene terephthalate; polymer sulfone, polyethylene, or polycarbonate, and inorganic sheets such as glass, quartz or so. The thickness of the substrate is preferably 2 to 5000 µm, more preferably 5 to 1000 µm. When the thickness is too thin, it becomes difficult to maintain strength and distance uniformity between the substrates, and when the thickness is too thick, vividness and contrast as a display capability degrade, and in particular, flexibility in the case of using for an electron paper deteriorates.

Moreover, as shown in FIGS. 1a to 1c, it is preferable to form partition walls 7 around each display element. The partition walls may be formed in two parallel directions. By this structure, unnecessary particle movement in the direction parallel with the substrate is prevented. Further, durability repeatability and memory retention are assisted. At the same time, the distance between the substrates is made uniform as reinforcing the strength of an image display panel. The formation method of the partition wall is not particularly restricted, however, a screen printing method wherein pastes are overlapped by coating repeatedly on a predetermined position by screen plate; a sandblast method wherein partition materials are painted with a desired thickness entirely over the substrate and then after coating resist pattern on the partition materials which is wanted to be left as a partition, jetting abrasive to cut and remove partition materials aside from the partition part; lift-off method (additive method) wherein a resist pattern is formed on the substrate using photosensitive polymer, and then after burying paste into a resist recess, removing the resist; photosensitive paste method wherein the photosensitive resin composition containing the partition materials is applied over the substrate and then obtaining a desired pattern by exposure & developing; and mold formation method wherein paste containing the partition materials is applied over the substrate and then forming a partition by compression bonding & pressure forming the dies having rugged structure; and so on are adopted. Further, modifying the mold formation method, relief embossing method wherein a relief pattern provided by a photosensitive polymer composition is used as a mold is also adopted.

Then, the particles used in the image display device according to the invention will be explained. Although any of colored particles negatively or positively chargeable having capability of flying and moving by Coulomb's force are employable, spherical particles with light specific gravity are particularly preferable. The average particle diameter is preferable to be 0.1 to 50 μm, particularly to be 1 to 30 μm. When the particle diameter is less than this range, charge density of the particles will be so large that an imaging force to an electrode and a substrate becomes too strong; resulting in poor following ability at the inversion of its electric field, although the memory characteristic is favorable. On the contrary, when the particle diameter exceeds the range, the following ability is favorable, however, the memory characteristic will degrade.

Although the method for charging the particles negatively or positively is not particularly limited, a corona discharge method, an electrode injection-charge method, a friction charge method and so on are employable. It is preferable that the absolute value of the difference between the surface charge densities of the particles, which are measured by a blow-off method using carriers, is not less than 5 μC/m$^2$ and not larger than 150 μC/m$^2$. When the absolute value of the surface charge density is less than this range, response speed to the change of an electric field will be late, and the memory property degrades. When the absolute value of the surface charge density exceeds this range, image force for the electrode or the substrate will be so strong that the memory property will be favorable, but following ability will be poor in the case where the electric field is inverted.

Hereinafter, the method of measuring the charge amount of particles and the method of measuring the specific gravity of particles, both necessary for calculating the surface charge density in the invention, will be explained.

<Blow-off Measuring Theory and Method>

In the blow-off method, a mixture of the particles and the carriers are placed into a cylindrical container with nets at both ends, and high-pressure gas is blown from the one end to separate the particles and the carriers, and then only the particles are blown off from the mesh of the net. In this occasion, charge amount of reverse blown polarity remains on the carriers with the same charge amount of the particles carried away out of the container. Then, all of electric flux by this electric charge are collected to Faraday cage, and are charged across a capacitor with this amount. Accordingly, the charge amount of the particles is determined as Q=CV (C: capacity, V: voltage across both ends of the capacitor) by measuring potential of both ends of the capacitor.

As a blow-off powder charge amount measuring instrument, TB-200 produced by Toshiba Chemical Co., Ltd. was used. Two kinds of positively chargeable and negatively chargeable resin were employed as the carriers, and charge density per unit area (unit: μC/m$^2$) was measured in each case. Namely, F963-2535 available from Powder TEC Co., Ltd. was employed as a positive chargeable carrier (the carrier whose opponent is positively charged and itself tends to be negative) and F921-2535 available from Powder TEC Co., Ltd. was employed as negatively chargeable carrier (the carrier whose opponent is negatively charged and itself tends to be positive). The surface charge density of the particles was obtained from the measured charge amount, the average particle diameter and specific gravity of the particles measured separately.

<Particle Specific Gravity Measuring Method>

The specific gravity was measured with the use of a hydrometer produced by Shimadzu Seisakusho Ltd. (brand name: Multi volume Density Meter H1305).

Because it is necessary for the particles to hold the charged electric charge, insulating particles with the volume specific resistance of 1×10$^{10}$ Ω·cm or greater are preferable, and in particular, insulating particles with the volume specific resistance of 1×10$^{12}$ Ω·cm or greater are more preferable. Further, the particles with slow charge attenuation property evaluated by the measuring method below are more preferable.

Namely, applying the voltage of 8 kV to a Corona generator disposed with a distance of 1 mm to the surface to generate Corona discharge, charging the surface, and then, measuring the change of the surface potential, determine the suitability. In this occasion, it is preferable to select the material whose maximum surface potential will be 300 V or greater after 0.3 seconds, more preferable to select the material whose maximum surface potential will be 400 V or greater after 0.3 second as the material for composing the particles.

Figure 5:
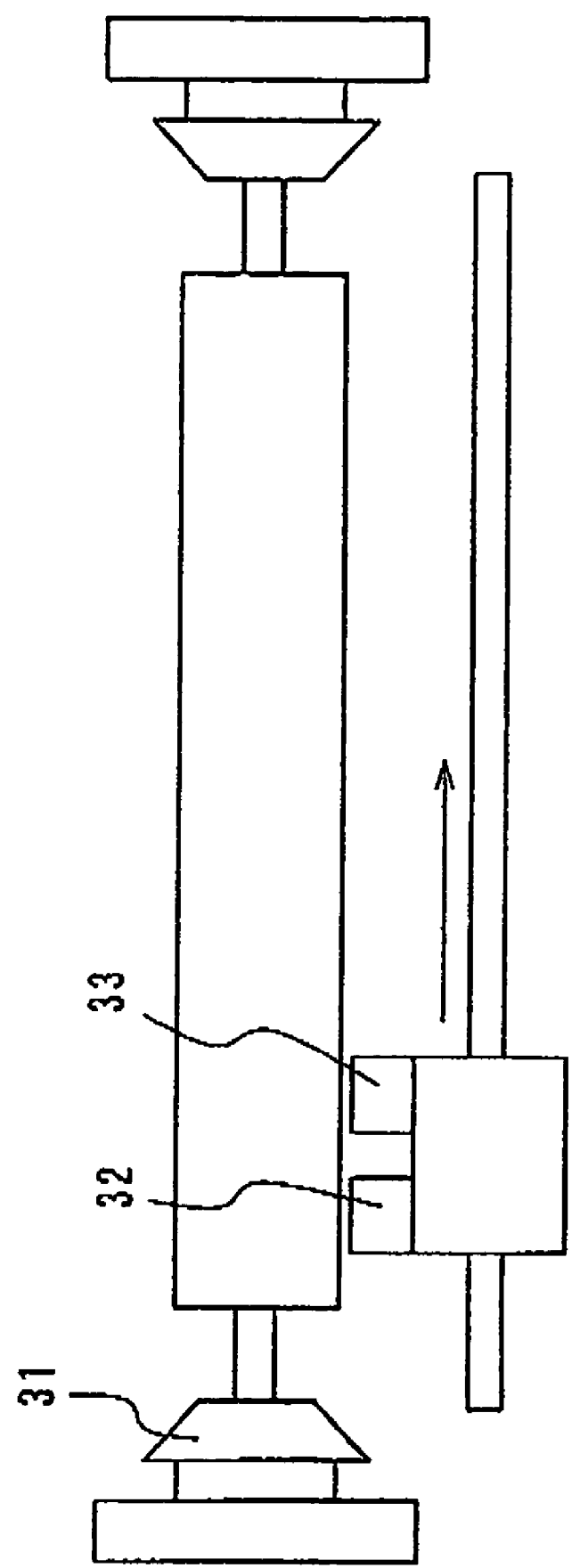
FIG. 5 is a schematic view illustrating the measuring instrument used for the measurement of surface potential of the particles in the image display device according to the invention.

Additionally, the foregoing surface potential is measured by means of an instrument (CRT2000 produced by QEA Inc.) as shown in FIG. 5. In this instrument both end portions of a roll shaft being held with chuck 31, compact scorotron discharger 32 and surface potential meter 33 are spaced with predetermined interval to form a measurement unit. Facedly deploying the measurement unit with a distance of 1 mm from the surface of the particles, and by moving the measurement unit from one end portion of the roll shaft to the other end portion with an uniform speed, with the state that the roll shaft remains stopping and while giving surface charge, a method of measuring its surface potential is preferably adopted. Moreover, measurement environment should be settled at the temperature of 25±3° C. and the humidity of 55±5% RH.

If the particles satisfy electrostatic property and so on, the particles may be formed by any materials. For example, it is formed by resin, charge control agent, coloring agent, inorganic additive and so on, or, by coloring agent and so on only.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable. Two kinds or more of these may be mixed and used.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon. Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, and tartrazinelake. Examples of orange pigments include red chrome yellow, molybdenum orange, permanent orange GTR, pyrazolone orange, Balkan orange, indusren brilliant orange RK, benzidine orange G, and Indusren brilliant orange GK, Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, and brilliant carmine 3B.

Examples of purple pigments include manganese purple, first violet B, and methyl violet lake. Examples of blue pigments include Berlin blue, cobalt blue, alkali blue lake, Victoria blue lake, phthalocyanine blue, metal-free phthalocyanine blue, partially chlorinated phthalocyanine blue, first sky blue, and Indusren blue BC. Examples of green pigments include chrome green, chromium oxide, pigment green B, Malachite green lake, and final yellow green G. Further, examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc. These coloring agents may be used alone or in combination of two or more kinds thereof. Particularly, carbon black is preferable as the black coloring agent, and titanium oxide is preferable as the white coloring agent.

Although the manufacturing method of the particles is not specifically restricted, mixing/grinding method or polymerization method for producing toner of electrophotography is, for example, similarly employable. Further the method of coating resin or charge control agent and so on over the surface of powders such as inorganic or organic pigments is also employable.

The distance between the facing substrates is suitably adjusted in a manner where the particles can move and maintain the contrast of image display; however, it is adjusted usually within 10 to 5000 μmm, preferably within 30 to 500 μm. The volume population of the particle existing in the space between the faced substrates is preferable to be 10 to 90%, more preferable to be 20 to 70%. When the volume population exceeds 80%, it causes some troubles in the particle movement, and when it is less than 10%, contrast tens to be indistinct.

In the image display panel used in the image display device according to the invention, plural of the foregoing display element are dispose in a matrix form, and images can be displayed. In the case of monochrome display, one display element makes one pixel. In the case of full color display, three kinds of display elements, i.e., one group of display elements each having color plate of R (red), G (green) and B (blue) respectively and each having particles of black composes a set of disposed elements preferably resulting in the reversible image display panel having the sets of the elements.

The image display device according to the invention is applicable to the image display unit for mobile equipments such as notebook personal computers, PDAS, cellular phones and so on; to the electric paper for electric book, electric newspaper and so on; to the bulletin boards such as signboards, posters, blackboards and so on; and to the image display unit for electric calculator, home electric application products, auto supplies and so on.

Hereinafter, the first aspect—the fifth aspect of the invention will be described in further detail.

Embodiment 1

Hereinafter, a weiting means without using an image deleting process, which is a feature of the first aspect of the image display device according to the invention, will be explained with reference to drawings. In the examples shown in FIGS. 6 and 7, a rewriting operation from numeral "1" to numeral "2" is explained on the 7 lines×5 rows matrix display.

Figure 6:
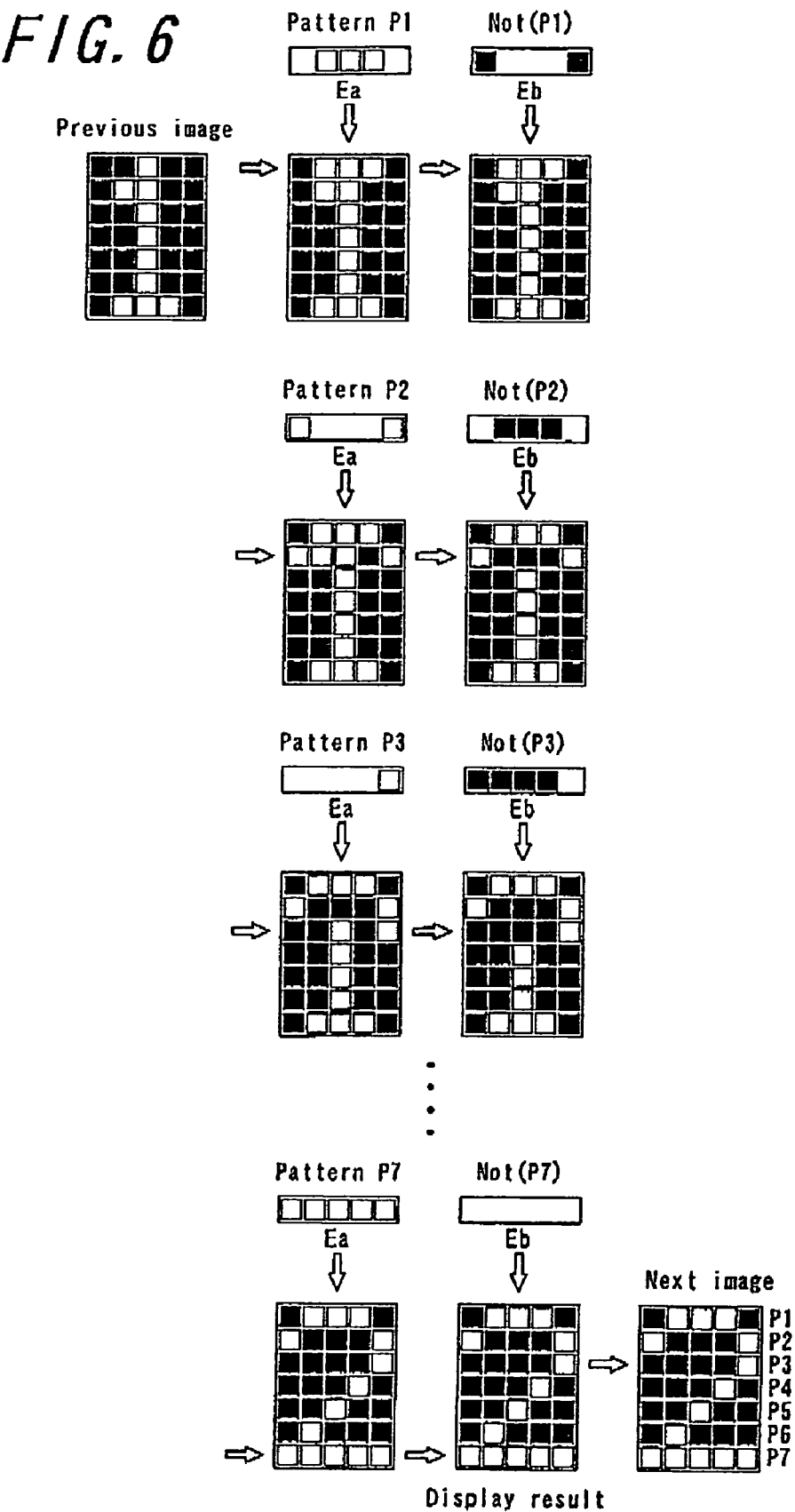
FIG. 6 is a schematic view for explaining one embodiment of a writing means without using an image deleting process in the image display device according to the invention.

In the example shown in FIG. 6, the image is formed by switching a direction of the electric field to be applied sequentially during an image forming process of a portion where the display is rewritable at once (normally one line) on the 7 lines×5 rows matrix display. Specifically, if patterns of 1 . . . n lines of the image "2" to be written next are assumed as P1 . . . Pn, in order to switch the direction of the electric field at every one line, firstly the pattern P1 is written by Ea on the first line and then the pattern Not(P1) is written by Eb on the first line. Secondary, the pattern P2 is written by Ea on the second line and the pattern Not(P2) is written by Eb on the second line. This operation is repeated till the state such that the pattern Pn is written by Ea on the n line and then the pattern Not(Pn) is written by Eb on the n line, so that it is possible to rewrite the numeral "1" to the numeral "2".

In this embodiment, since the image is formed by switching a direction of the electric fields Ea and Eb sequentially one line by one line on the matrix display, it is possible to display a motion picture with no anter image as compared with the example described later as FIG. 7.

Figure 7:
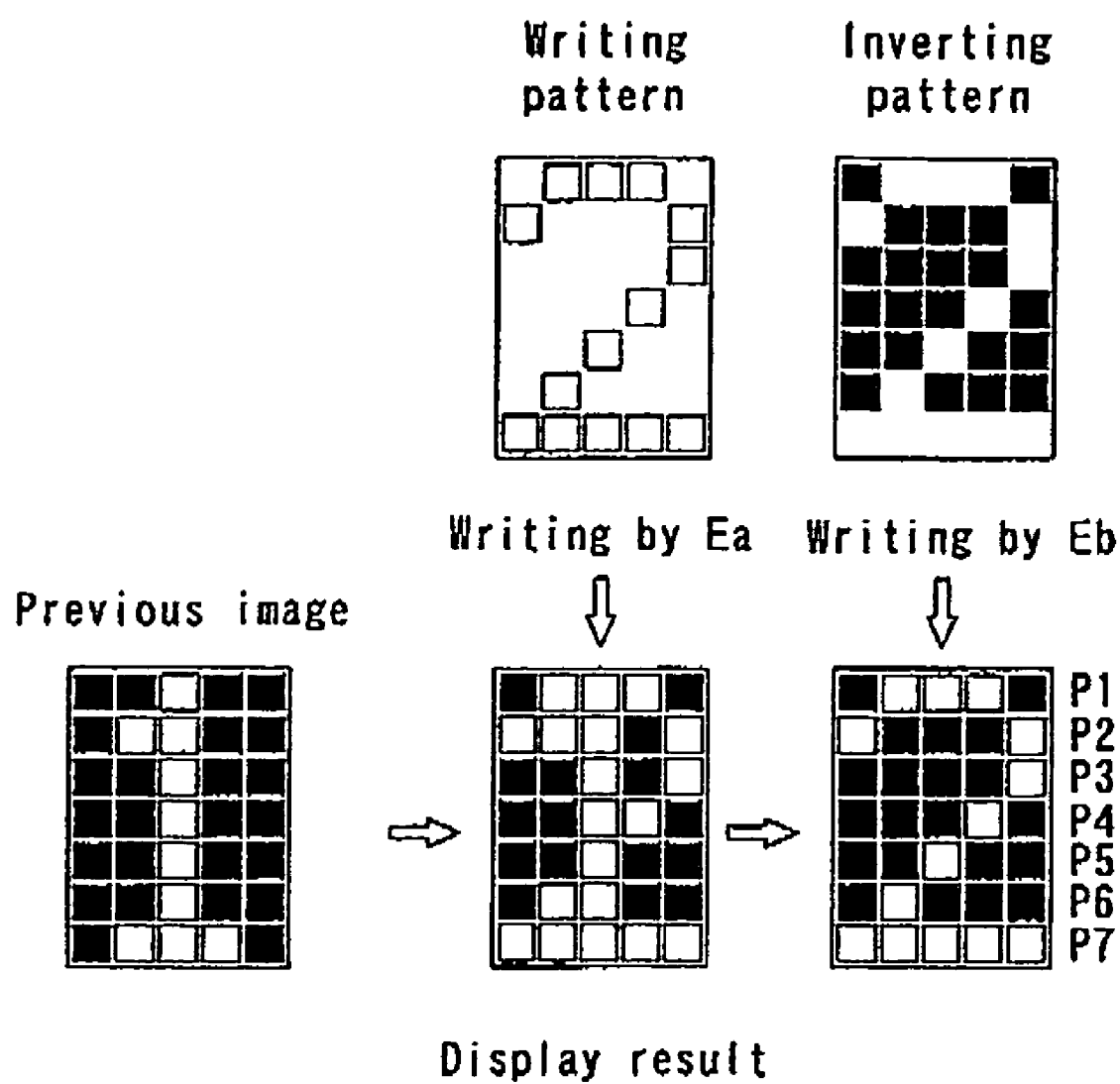
FIG. 7 is a schematic view for explaining another embodiment of a writing means without using an image deleting process in the image display device according to the invention.

In the example shown in FIG. 7, on the 7 lines×5 rows matrix display, firstly the 7×5 writing pattern indicating the numeral "2" is written by the same direction of the electric field Ea, and then the inverting 7×5 writing pattern indicating the numeral "2" is written by the switched direction of the electric field Eb, so that it is possible to rewrite the numeral "1" to the numeral "2".

In this embodiment, on the matrix display, the writing pattern indicating the numeral "2" is formed for one whole image by Ea, and then the inverting writing pattern "2" that is a nega of the writing pattern "2" is formed for one whole image by the switched Eb. In this case, even after the image is formed by Ea, a portion of the particles A for the previous image, which is supposed to be replaced by the particles B, remains. Therefore, it is recognized as the after image on the motion picture. However, since the electric field switching frequency between Ea and Eb is extremely low as compared with the example shown in FIG. 6, it is possible to make a generation of electromagnetic noise due to a display element drive smaller, and thus it is possible to make a limit of frame operation speed due to a capacitance between the display element electrodes higher.

Embodiment 2

Then, the operation for the halftone image display (gray level display) and the particle sate reset operation prior to the halftone image display, which are performed by the second aspect of the image display device according to the invention, will be explained with reference to FIGS. 8a, 8b and FIG. 9.

Figure 8A:
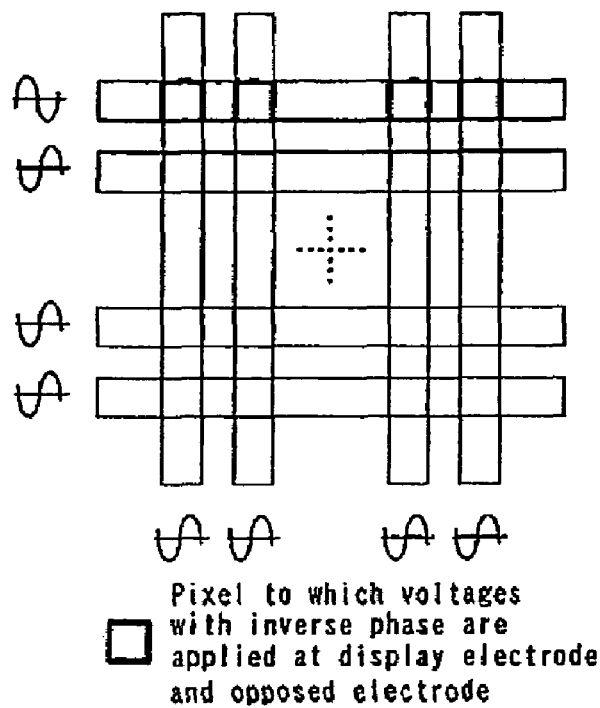
FIG. 8a is a schematic view for explaining a method of applying a reset voltage for a particle state reset operation prior to a halftone image display in the image display device according to the invention.
Figure 8B:
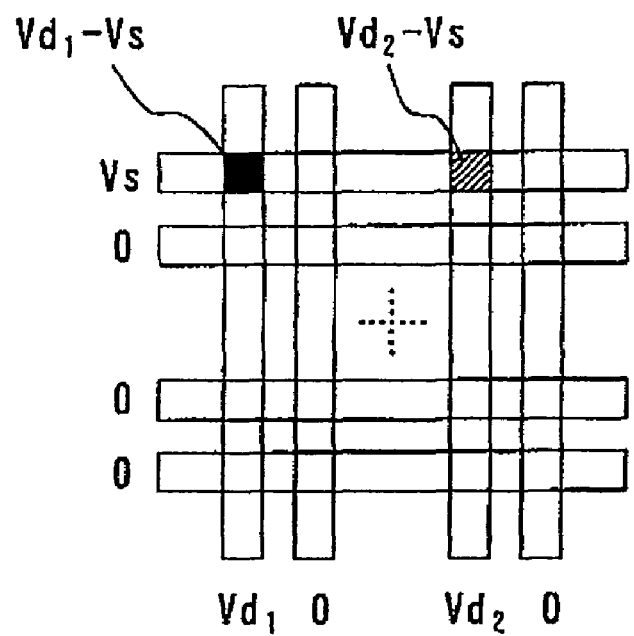
FIG. 8b is a schematic view for explaining a method of applying an electric field for a halftone image display in the image display device according to the invention.

FIG. 8a is a schematic view for explaining a method of applying a reset voltage for a particle state reset operation prior to a halftone image display in the image display device according to the second aspect of the invention, and FIG. 8b is a schematic view for explaining a method of applying an electric field for a halftone image display in the image display device according to the second aspect of the invention. In FIGS. 8a and 8b, a horizontally arranged rectangle corresponds to the display electrode 3, a vertically arranged rectangle corresponds to the opposed electrode 4, and an intersecting portion between the horizontally arranged rectangle and the vertically arranged rectangle corresponds to the image display element. Here, it, as shown in FIG. 8b, a voltage Vs is applied to the image display element on the uppermost line and leftmost row from the display electrode side and a voltage Vd1 is applied thereto from the opposed electrode side, the image display element shows a display state such that the particles A and the particles B are mixed with a mixing ratio corresponding to a magnitude of electric field (Vd1−Vs)/g, here, g: distance between electrodes (electric field intensity). In the same way, if, as shown in FIG. 8b, a voltage Vs is applied to the image display element on the uppermost line and third row from leftmost one from the display electrode side and a voltage Vs2 is applied thereto from the opposed electrode side, the image display element shows a display state such that the particles A and the particles B are mixed with a mixing ratio corresponding to a magnitude of electric field (Vd2−Vs)/g, here, g: distance between electrodes (electric field intensity).

Here, it is assumed for example that a color of the particles A is black and a color of the particles B is white. In this case, if the mixing ratio of the particles A and the particles B is 100:0, the image display element shows a black color as is the same as the case in which a normal image forming electric field is applied. If the mixing ratio of the particles A and the particles B is 0:100, the image display element show a white color as is the same as the case in which a normal image forming electric field is applied. Under such a condition, if the magnitude of electric field (Vd1−Vs)/g is set to be close to the magnitude of electric field for the black display, the image display element on the uppermost line and leftmost row shows a halftone image near black color. In the same way, if the magnitude of electric field (Vd2−Vs)/g is set to be close to the magnitude of electric field for the white display, the image display element on the uppermost line and third row from leftmost one shows a halftone image near white color. In this manner, it is possible to obtain a display state such that the particles A and the particles B are mixed with a desired mixing ratio by adjusting a magnitude of electric field applied between the display electrode and the opposed electrode in response to a desired display density. In this case, as shown in FIG. 8b, the image display element, to which 0 electric field is applied on at least one of electrodes, maintains its display color prior to the voltage application.

In the example mentioned above, the halftone image display is performed by adjusting the electric field intensity applied between the display electrode and the opposed electrode. However, the halftone image display of this example may be performed by adjusting an applying time period of electric field applied between the display electrode and the opposed electrode, or, by adjusting an applying number of electric field applied between the display electrode and the opposed electrode, or, by adjusting electric field intensity, electric field applying time period and electric field applying number at the same time.

Figure 9:
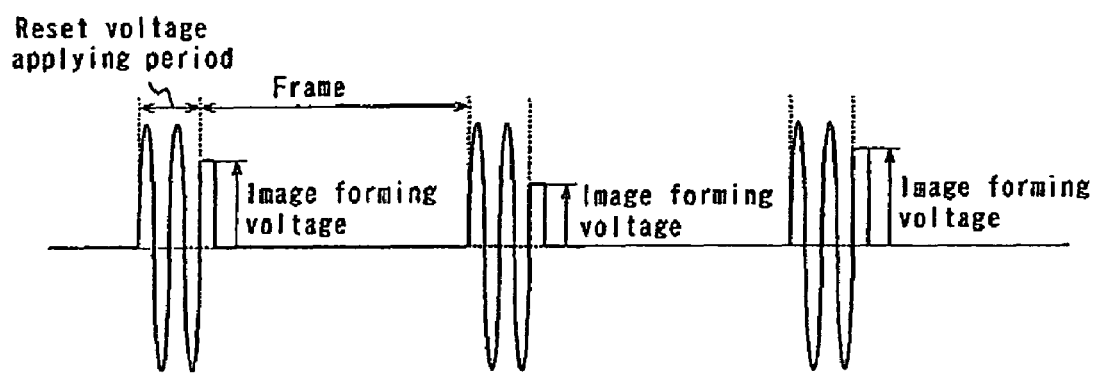
FIG. 9 is a schematic view for explaining a method of applying a reset voltage for a particle state reset operation prior to a halftone image display in the image display device according to the invention.

FIG. 9 is a schematic view for explaining a method of applying a reset voltage for a particle state reset operation prior to a halftone image display in the image display device according to the invention. In this embodiment, as shown in FIG. 9, a reset voltage applying period is arranged from an end of previous frame to a start of current frame. During the reset voltage applying period, the reset voltage for generating an alternating electric field as a reset electric field is applied. The reset voltage is set to be a voltage value larger than that of an image forming voltage applied for the display for the particles A only, the display for the particles B only, and the halftone image display between the particles A and the particles B. Moreover, a reset voltage application is performed by applying voltages having inversion phase (reset voltage and inversion reset voltage) to the display electrode and the opposed electrode. In the image display element to which the reset voltage is applied (shown by a black quadrate in FIG. 8b), previous image display state is reset.

The reason for applying the reset voltage mentioned above is as follows. That is, in the case that the halftone image display is performed by adjusting the applied electric field intensity as shown in FIG. 8b, if the mixing state between the particles A and the particles B is once reset, an actual mixing ratio between the particles A and the particles B is deviated from the desired mixing ratio due to an influence of the previous image prior to the halftone image display. The reset voltage is applied for eliminating this mixing ratio deviation. In this manner, if the mixing state between the particles A and the particles B is once reset prior to the halftone image display, it is possible to reduce the influence of the previous image prior to the halftone image display, and thus it is possible to realize the desired halftone image display with an excellent reproducibility.

In this case, since the alternating electric field is used as the reset electric field, the particles A and the particles B are flown between the display electrode and the opposed electrode, and thus it is possible to realize a desired state such that an interaction between the particles and the electrode surfaces can be made minimum. Therefore, it is possible to realize the mixing state between the particles A and the particles B due to successive voltage applications with more excellent reproducibility.

In the example mentioned above, the alternating electric field is used as the reset electric field, but instead a pulse electric field may be used as the reset electric field. In this case, even in the case that a frame scan period is limited as a motion picture display and so on, if the reset electric field sufficient for all the particles fly is applied in a form of the pulse, it is possible to obtain the desired reset state in a short time.

Embodiment 3

FIGS. 10a to 10d are schematic views respectively showing one embodiment of sub-pixels in the third aspect of the image display device according to the invention. The embodiment shown in FIGS. 10a to 10d shows the sub-pixels obtained by segmentalizing one pixel unevenly. Specifically, one pixel (FIG. 10b) in the 20×20 dots matrix display shown in FIG. 10a is segmentalized into sub-pixels each having a different size. In this case, sizes of the sub-pixels are to be two's power i.e. six sub-pixels have sizes of $2^0(=1)$, $2^1(=2)$, $2^2(=4)$, $2^3(=8)$, $2^4(=16)$ and $2^5(=32)$ respectively.

As for a method of segmentalizing one pixel unevenly, as shown in FIG. 10c, use may be made of six sub-pixels each having a rectangular shape with a different area. Moreover, as shown in FIG. 10d, use may be made of six sub-pixels each having same width along a line direction and different width along a row direction, i.e. each having a different area. The uneven segmentalization shown in FIG. 10c is difficult on drive, and thus the uneven segmentalization shown in FIG. 10d is more useful. In both uneven segmentalizations mentioned above, the halftone image display can be performed by appropriately driving the sub-pixels, and further it is possible to maintain the halftone image even after power OFF state.

As shown in FIGS. 10*c* and 10*d*, if the sub-pixels are formed by segmentalizing one pixel unevenly, it is possible to obtain a larger number of area patterns by a smaller number of sub-pixel combinations. If the number of the sub-pixels is smaller, a drive circuit for driving the sub-pixels can be made smaller and realize a compact and inexpensive construction. Moreover, if the sizes of the sub-pixels are to be two's power i.e. 1, 2, 4, 8 . . . , it is possible to obtain a combination of sub-pixels total area by a smallest segmentalization number of the sub-pixels. Further, in addition to the halftone image display, if the sub-pixels are segmentalized on the basis of γ correction coefficient due to a visual sensitivity, it is possible to eliminate a distortion of the image at a high density display portion and to obtain the image display device with more excellent representational power.

Figure 11:
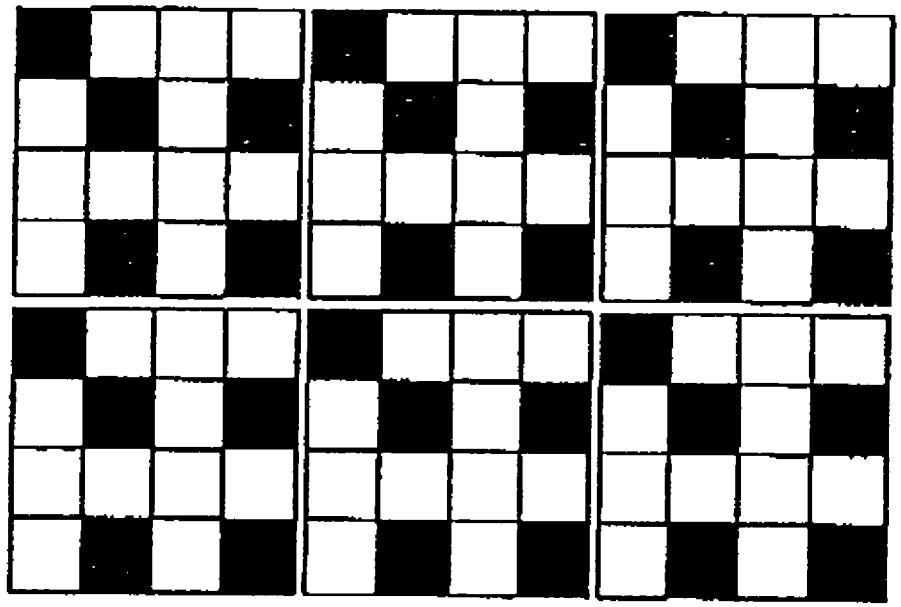
FIG. 11 is a schematic view illustrating another embodiment of the sub-pixels in the image display device according to the invention.
Figure 12:
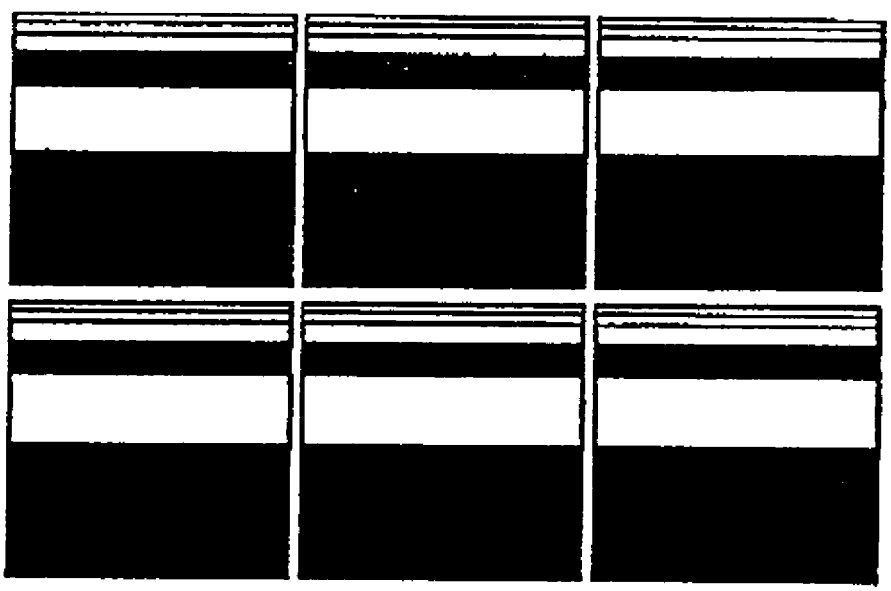
FIG. 12 is a schematic view for explaining a pseudo pattern generated due to continuous same gray level regions in the sub-pixels segmentalized unequally.

FIG. 11 is a schematic view showing another embodiment of the sub-pixels in the third aspect of the image display device according to the invention. The embodiment shown in FIG. 11 shows the sub-pixels obtained by segmentalizing one pixel evenly. Specifically, one pixel is segmentalized into 4×4 sub-pixels. Even in the embodiment shown in FIG. 11, the halftone image display can be performed by appropriately driving the sub-pixels, and also the halftone image can be maintained after power OFF. As shown in FIG. 11, if the sub-pixels are formed by segmentizing one pixel evenly so as to indicate the same halftone image by a different sub-pixels patterns, it is possible to prevent a generation of a pseudo pattern (line) in the case of the unevenly segmentalized sub-pixels as shown in FIG. 12 at a portion where the pixels having same gray level are continued, and thus it is possible to obtain the image with a high quality.

As the preferred embodiment of the third aspect of the image display device according to the invention, One frame is further segmentalized to a plurality of sub-frames, and the halftone image is displayed by a deviation of the display pattern of the sub-frames. In this case, the halftone image display due to the sub-pixels and the halftone image display due to the sub-frames can be utilized at the same time, and thus it is possible to display the image with more gray levels as compared with the halftone image display utilizing only one of sub-pixels and sub-frames.

Embodiment 4

Then, the operation for the halftone image display (gray level display) performed in the fourth aspect of the image display device according to the invention will be explained with reference to FIGS. 13*a* and 13*b*. Hereinafter, for the sake of simplicity of the explanation, the explanation is performed by the case of $2^3=8$ gray level display, but it is a matter of course that $2^n$ gray level display can be performed if the kinds n of the sub-frames.

Figure 13A:
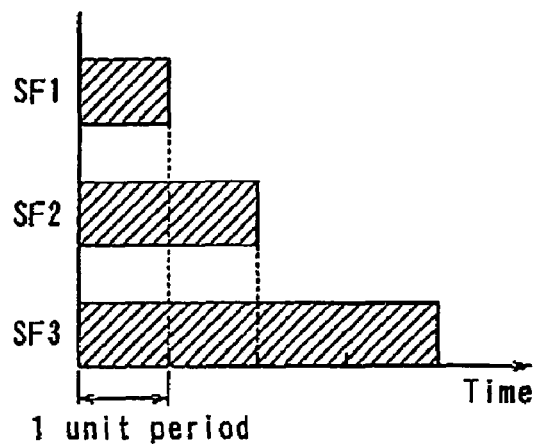
FIG. 13a is a schematic view showing the sub-frames used for a halftone image display in the image display device according to the invention.

FIG. 13*a* is a schematic view showing the sub-frames used for the halftone image display in the image display device according to the invention. In this invention, the sub-frame having a length sinaller than that of one frame is formed, and the halftone image is displayed by a display pattern formed by at least one sub-frame. In this case, as the sub-frame, use is made of plural sub frames SF1, SF2, SF3 having different length with each others.

That is, in FIG. 13*a*, SF1 is the sub-frame having a length corresponding to one unit period (1 unit length), SF2 is the sub-frame having a length corresponding to two unit periods, and SF3 is the sub-frame having a length corresponding to four unit periods. Here, the reason for setting respective sub-frame lengths to the length (time period) obtained by multiplying a unit length and a two's power as SF1=unit period×$2^0$, SF2=unit period×$2^1$, SF3=unit period×$2^2$, is to realize $2^3=8$ gray level display only by using three kinds (small number) of the sub-frames.

Figure 13B:
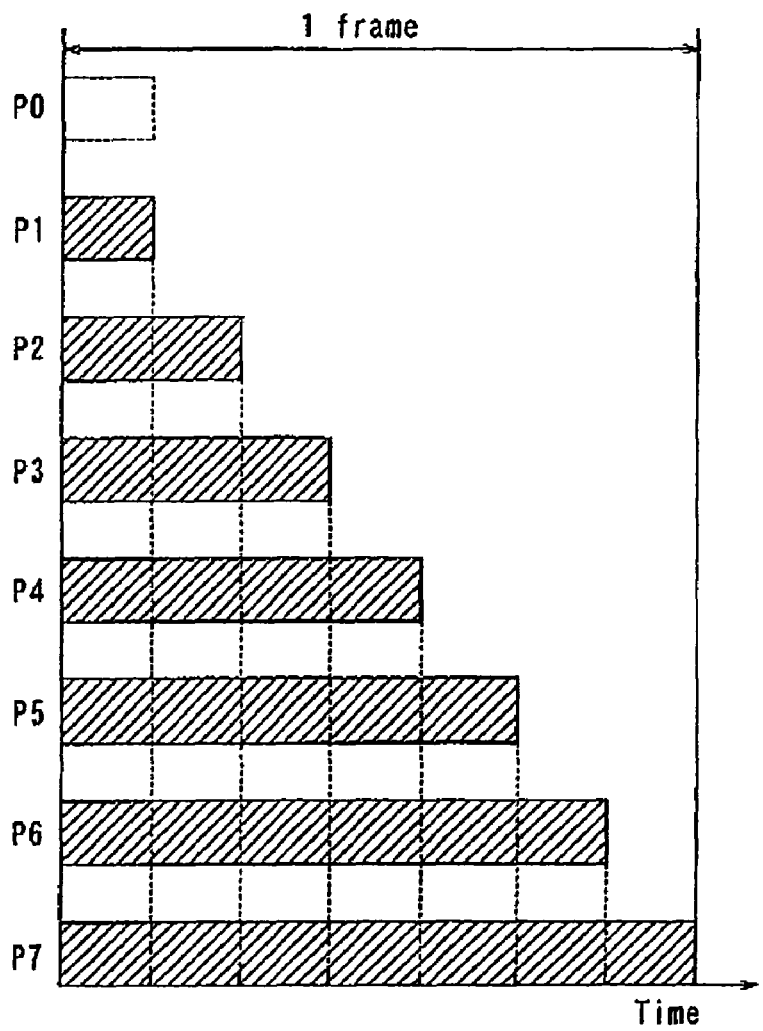
FIG. 13b is a schematic view illustrating various display patterns used for a halftone image display in the image display device.

FIG. 13*b* is a schematic view showing various display patterns used for the halftone image display according to the invention. In FIG. 13*b*, for example, it is assumed that a color of the particles A is black and a color of the particles B is white. In this case, a period for displaying the particles A is shown by a hatched rectangle. Under such a condition, P0 is the display patter for displaying no particles A, P1 is the display pattern for displaying the particles A in one unit period by utilizing the sub-frame SF1, P2 is the display pattern for displaying the particles A in two unit periods by utilizing the sub-frame SF2, P3 is the display pattern for displaying the particles A in three unit periods by utilizing the sub-frames SF1 and SF2, P4 in the display pattern for displaying the particles A in four unit periods by utilizing the sub-frame SF3, P5 is the display pattern for displaying the particles A in five unit periods by utilizing the sub-frames SF1 and SF3, P6 is the display pattern for displaying the particles A in six unit periods by utilizing the sub-frames SF2 and SF3, and P7 is the display pattern for displaying the particles A in seven unit periods by utilizing the sub-frames SF1, SF2 and SF3. In the embodiment shown in FIG. 13*b*, the unit time period corresponds to $\frac{1}{7}$ of one frame.

In the image display device according to the invention, the display pattern used for displaying the halftone image is not limited to the examples shown in FIG. 13*b*. For example, in the case of the display pattern P5 consisting of plural sub-frames, other combinations of the sub-frames may be utilized if the total unit period is five. Moreover, the display patterns shown in FIG. 13*b* show the display pattern in which the display is performed from a start of the current frame and a predetermined unit period continues from this start point However, if a predetermined unit period can be accomplished the display may start from an arbitral point of the current frame. Moreover, a plurality of sub-frames may be displayed discontinuously. In the embodiment shown in FIGS. 13*a* and 13*b*, use is made of the display patterns P0 to P7 utilizing at least one sub-frames SF1, SF2 and SF3 each having a length smaller than that of one frame and a different length with each other. Moreover, the display patterns P0 to P7 may be constructed by only one sub-frame SF1 having a length smaller than one frame if the number of SF1 it equal to the number of the predetermined unit period.

In the image display device according to the invention, the halftone image is displayed by utilizing the display patterns P0 to P7 consisting of at least one sub-frames SF1, SF2 and SF3 each having different length with each other, instead of displaying the halftone image by adjusting the display area ratio of particles A/particles B. Therefore, it is possible to display the halftone image without complicating the drive circuit of the image display element. Moreover, since a larger number of gray levels can be obtained with a lower drive clock frequency by utilizing the sub-frames SF1, SF2 and SF3 each having different length with each other, it is possible to obtain the image display device having a compact and inexpensive construction. Further, since the length of respective sub-frames SF1, SF2 and SF3 is set to a length obtained by multiplying a unit length and a two's power, it is possible to obtain a larger number of gray levels with an equal gradation by a rough segmentalization number.

In the image display device according to the invention, a length of respective sub-frames is determined to be a length obtained by multiplying a unit length and a two's power, but it may be determined on the basis of γ correction coefficient due to a visual sensitivity. In this case, it is possible to prevent a distortion of the image at the high density display portion and to obtain the image display device with excellent representational power.

Moreover, in the image display device according to the invention, the sub-frame having a length smaller than that of one frame is formed, and the halftone image formed by at least one sub-frame. However, it is possible to combine the method such that one pixel is segmentalized to a plurality of sub-pixels and the halftone image is displayed by the display pattern formed by at least one of plural sub-pixels. In this case, since two kinds of the halftone image displaying methods are used, it is possible to extremely increase the feasible number of gray levels.

Embodiment 5

Then, the method for correcting a fly/move current in the halftone image display (gray level display) performed in the fifth aspect of the invention will be explained with reference to FIGS. 14a and 14b.

Figure 14A:
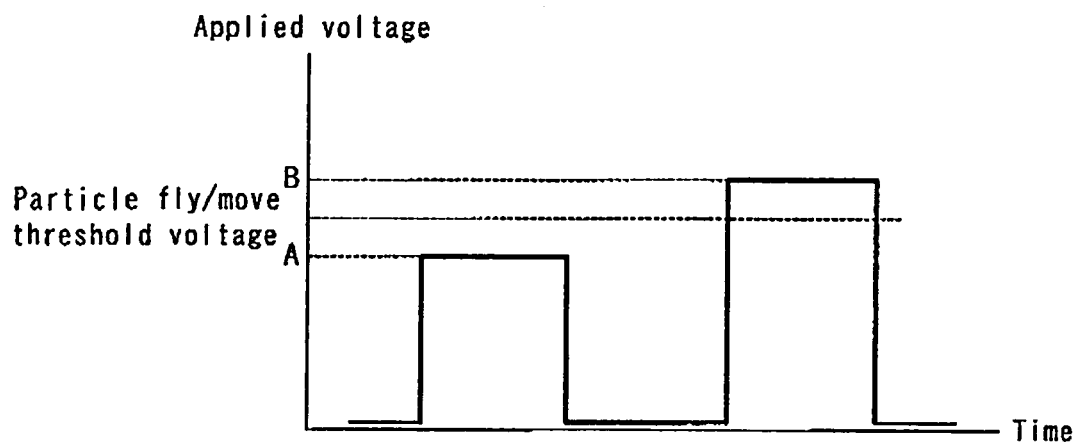
FIGS. 14a and 14b are schematic views respectively explaining a method of correcting fly/move current when a halftone image display is performed in the image display device according to the first embodiment.
Figure 14B:
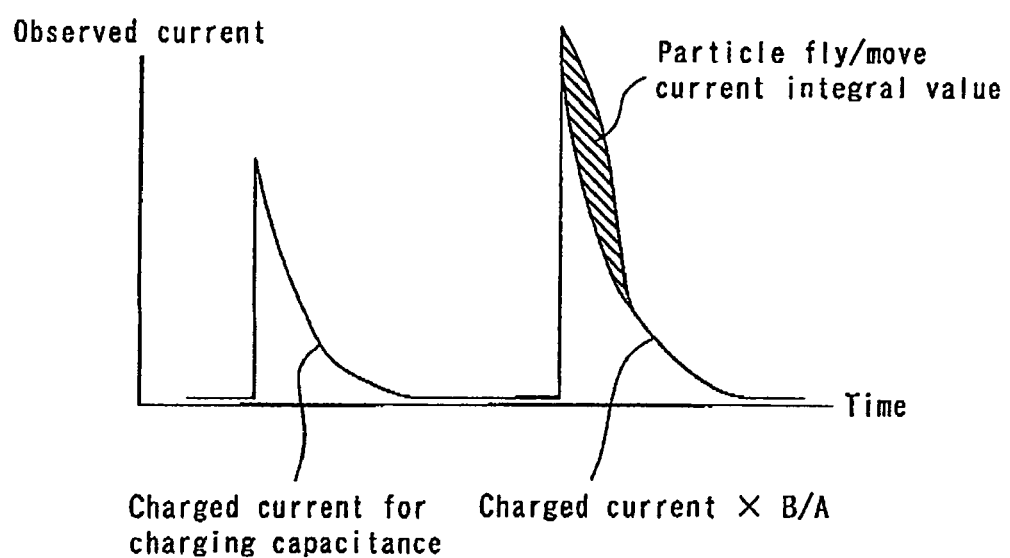
Figure 15:
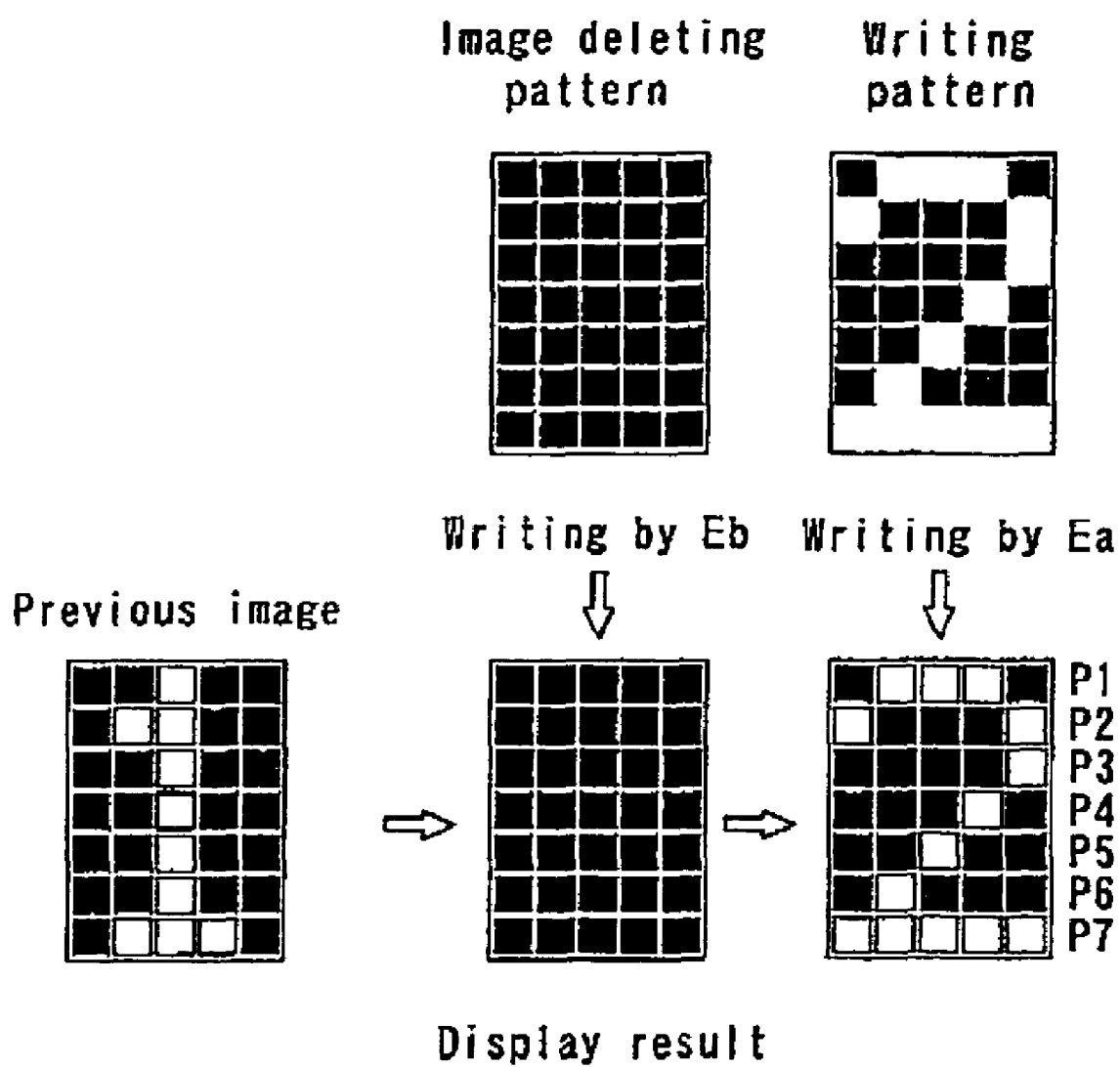
FIG. 15 is a schematic view for explaining an image rewriting means in a known image display device.

FIGS. 14a and 14b are schematic views respectively explaining the method of correcting the fly/move current when the halftone image display is performed in the image display device according to the fifth aspect of the invention. In this embodiment, it is considered that, when a voltage is applied between the electrodes of the image display panel of the image display device, a fly/move current due to a particle fly/move motion and also a charged current for charging capacitance between the electrodes are flown. Therefore, a current flowing when the voltage is applied between the electrodes is simply observed, and then an observed voltage calculated by summing the fly/move current and the charged current is obtained.

Since the charged current is preliminarily obtained by a calculation utilizing an electrode distance, a gas charged between the electrodes, a dielectric constant of the particles and so on, it is possible to obtain the fly/move current from the observed current value by utilizing such calculation value. However, if the calculation value is used as it is, it is not possible to correct a variation of a display density in the case that a variation of the charged current waveform is generated by a variation of a cell gap between the electrodes in the image display panel.

Therefore, in this embodiment, with respect to the current pixel to be displayed and the pixels adjacent to the current pixel, as shown in FIG. 14a, a first current waveform (current waveform shown in left side of FIG. 14b) that is the charged current generating when a voltage A having a voltage value less than a particle fly/move threshold voltage, and a second current waveform (current waveform shown in right side of FIG. 14b) that is the observed current generating when a voltage B having a voltage value larger than the particle fly/move threshold voltage are observed, and the observed current waveform is corrected on the basis of the charged current waveform. Specifically, the fly/move current after correction is obtained by calculating (fly/move current)=(observed current)−(charged current×B/A) with the use of the applied voltage corresponding to a desired halftone image to be actually displayed as the voltage B. In this case, the correction is performed on the basis of an integral value of the particle fly/move current.

In this manner, when the halftone image display is performed in the fifth aspect of the image display device according to the invention, the current waveform utilized for the calculation of the fly/move current is optimized, and thus it is possible to correct the variation of the display density.

In the example mentioned above, the halftone image display is realized by adjusting the voltage value applied between the electrodes. However, instead of the adjustment of the voltage value mentioned above, one or more objects of waveform, applied period and applied number of the voltage applied between the electrodes may be adjusted.

In the first to fifth aspects of the invention mentioned above, the electrodes (display electrode, opposed electrode) are arranged on the substrates (transparent substrate, opposed substrate). In this case, the term "arranged on the substrate" include the case such that "the electrode is arranged on the substrate directly" and the case such that "the electrode is arranged on the substrate with a space".

INDUSTRIAL APPLICABILITY

In the image display device according to the first aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Moreover, since the image deleting process prior to forming the image to be displayed is eliminated, it is possible to reduce density unevenness and maintain the display quality.

In the image display device according to the second aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Moreover, in order to display a halftone image, since a display state such that two or more groups of particles are mixed with a predetermined ratio is obtained by adjusting, in response to a display density, at least one of strength, applying time and applying number of the electric field applied between the electrodes, it is possible to utilize a display memory property and display an excellent halftone image. Further, since the states of two or more groups of particles are once reset prior to the halftone image display, it is possible to eliminate an influence of the display state prior to the halftone image display and to realize a desired excellent halftone image display with good reproducibility.

In the image display device according to the third aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Moreover, since the halftone image display is not performed by repeating particles A/particles B, it is possible to utilize a display memory property and display an excellent halftone image.

In the image display device according to the fourth aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability.

Further, as to a method for displaying a halftone image, use is made of the method such that a sub-frame having a length smaller than that of one frame is formed, and a halftone image is displayed by a display pattern formed by at least one sub-frames, in stead of a method such that a display area ratio of particles A/particles B is adjusted. Therefore, it is possible to display a halftone image without complicating a drive circuit of image display elements.

In the image display device according to the fifth aspect of the invention, since a novel image display device is constructed by arranging image display elements in a matrix manner, which can fly and move the particles by means of Coulomb's force and so on when an electrostatic field is directly applied to the particles, it is possible to obtain an image display device which can realize rapid response, simple and inexpensive construction, and excellent stability. Further, as to a method for displaying a halftone image, use is made of the method such that at least one of voltage value, waveform, applying time and applying number of the voltage applied between the electrodes is adjusted in response to a gray level of respective pixels forming the image to be displayed, in such a manner that an integral value of a fly/move current generating at a fly/move motion of particles becomes a predetermined target value. Therefore, it is possible to display the halftone image with excellent reproducibility.

The invention claimed is:

1. An image display device which comprises an image display panel, in which two or more groups of particles having different colors and different charge characteristics are sealed between two substrates, at least one of two substrates being transparent, and, in which the particles, to which an electrostatic field produced by a pair of electrodes provided on one or both substrates is applied, are made to fly and move so as to display an image, wherein an image including a plurality of display elements is formed by:

applying an electric field pattern between the electrodes, the electric field pattern serving to fly particles A to the substrate at an image display side; and applying an inversion electric field pattern with respect to the electric field pattern, the inversion electric field pattern serving to fly particles B having different colors and different charge characteristics with respect to those of the particles A to the substrate at an image display side in order to eliminate the need for an image deleting process prior to forming the image, wherein, the image is provided in a matrix display, and the image is formed by sequentially applying the electric field pattern and the inversion electric field pattern to a portion of the matrix display where the display is rewritable, then applying the electric field pattern and the inversion electric field pattern to another portion of the matrix display;

wherein, in the matrix display, the image is formed by first applying the electric field pattern to a group of electrodes in a portion where the display is rewritable, then applying the inversion electric field pattern to the other electrodes of the same portion which are opposite from the electrodes to which the electric field pattern is applied, and then sequentially applying the electric field pattern and the inversion electric field pattern to other portions of the matrix display.

2. The image display device according to claim 1, wherein an average particle diameter of the particles is 0.1 to 50 µm.

3. The image display device according to claim 1, wherein a surface charge density of the particles measured by a carrier and in accordance with a blow-off method is not less than 5 µC/m$^2$ and not greater than 150 µC/m$^2$ in an absolute value.

4. The image display device according to claim 1, wherein the particles are particles in which the maximum surface potential, in the case that the surface of particles is charged by a generation of Corona discharge caused by applying a voltage of 8 KV to a Corona discharge device deployed at a distance of 1 mm from the surface, is 300 V or greater at 0.3 second after the discharge.

5. The image display device according to claim 1, wherein a color of the particles is a white or a black.

6. The image display device according to claim 1, wherein the image display panel comprises one or more image display elements formed by separating respective paired electrodes of the matrix electrodes with each other by means of a partition wall.

7. The image display device according to claim 1, wherein the portion of the matrix display to which the electric field pattern and the inversion electric field pattern are applied is one line.

8. The image display device according to claim 7, wherein the one line is a row of the display matrix.

9. The image display device according to claim 8, wherein the electric field pattern and the inverse electric field pattern are applied through switches.

10. The image display device according to claim 8, wherein the electric field pattern and the inverse electric field pattern applied to each row and each column are controlled by a row driver circuit and a column driver circuit, respectively.

* * * * *